United States Patent
Kuroda et al.

(10) Patent No.: US 9,297,933 B2
(45) Date of Patent: Mar. 29, 2016

(54) ANTIGLARE FILM, POLARIZER AND IMAGE DISPLAY DEVICE

(71) Applicant: Dai Nippon Printing Co., Ltd., Tokyo (JP)

(72) Inventors: Takashi Kuroda, Tokyo (JP); Seiichi Isojima, Tokyo (JP); Makoto Honda, Tokyo (JP); Gen Furui, Tokyo (JP); Junya Eguchi, Tokyo (JP); Eiji Ooishi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 240 days.

(21) Appl. No.: 13/693,693

(22) Filed: Dec. 4, 2012

(65) Prior Publication Data

US 2013/0279155 A1    Oct. 24, 2013

(30) Foreign Application Priority Data

Apr. 19, 2012  (JP) ................................ 2012-096105
Jun. 15, 2012  (JP) ................................ 2012-136356

(51) Int. Cl.
  *G02B 1/11*    (2015.01)
  *G09F 13/04*   (2006.01)
  *G02B 5/02*    (2006.01)
  *G02B 5/30*    (2006.01)

(52) U.S. Cl.
  CPC ................ *G02B 1/11* (2013.01); *G02B 5/0226* (2013.01); *G02B 5/0294* (2013.01); *G09F 13/04* (2013.01); *B32B 2457/202* (2013.01); *G02B 5/3083* (2013.01)

(58) Field of Classification Search
  None
  See application file for complete search history.

(56) References Cited

U.S. PATENT DOCUMENTS

| | | | |
|---|---|---|---|
| 5,051,309 A | 9/1991 | Kawaki et al. | |
| 7,839,570 B2 * | 11/2010 | Iwata et al. | 359/599 |
| 2003/0103186 A1 | 6/2003 | Sasaki et al. | |
| 2006/0099385 A1 * | 5/2006 | Onozawa et al. | 428/141 |
| 2008/0113116 A1 | 5/2008 | Hiraike et al. | |
| 2009/0279176 A1 * | 11/2009 | Wang et al. | 359/601 |
| 2010/0039708 A1 * | 2/2010 | Suzuki et al. | 359/601 |

(Continued)

FOREIGN PATENT DOCUMENTS

| | | |
|---|---|---|
| CN | 1412582 A | 4/2003 |
| CN | 101650447 A | 2/2010 |

(Continued)

*Primary Examiner* — Gwendolyn Blackwell
*Assistant Examiner* — Anthony J Frost
(74) *Attorney, Agent, or Firm* — Hamre, Schumann, Mueller & Larson, P.C.

(57) ABSTRACT

Provided is an antiglare film having a hard coat property, capable of highly suppressing generation of a rainbow interference pattern and interference fringes in display images, preventing white muddiness and scintillation of a display screen, while giving high contrast in a bright room and a dark room. The antiglare film includes an antiglare layer having an uneven form on its surface and formed on one face of a transparent substrate having an in-plane birefringence and a retardation of 3000 nm or higher. The antiglare layer contains silica fine particles, organic fine particles, and a binder resin. The silica particles include particles forming agglomerates to be contained coarsely and densely in the antiglare layer. The agglomerates are distributed densely around the organic fine particles, and some agglomerates adhere to surfaces of the organic particles and/or some silica particles are impregnated in the inside of the organic particles.

12 Claims, 4 Drawing Sheets

(56) References Cited

U.S. PATENT DOCUMENTS

| | | | |
|---|---|---|---|
| 2010/0079868 A1* | 4/2010 | Asakura et al. | 359/586 |
| 2010/0143702 A1 | 6/2010 | Im et al. | |
| 2012/0229732 A1* | 9/2012 | Koike et al. | 349/69 |
| 2013/0250414 A1 | 9/2013 | Eguchi et al. | |

FOREIGN PATENT DOCUMENTS

| | | |
|---|---|---|
| CN | 101961940 A | 2/2011 |
| JP | 3-39903 | 2/1991 |
| JP | 11-286083 | 10/1999 |
| JP | 2003-025504 | 1/2003 |
| JP | 2003-177209 | 6/2003 |
| JP | 2004-345333 | 12/2004 |
| JP | 2007-196421 A | 8/2007 |
| JP | 2008-003541 | 1/2008 |
| JP | 2008-046497 A | 2/2008 |
| JP | 2008-287072 A | 11/2008 |
| JP | 2009-156938 | 7/2009 |
| JP | 2009-204728 A | 9/2009 |
| JP | 2010266672 | 11/2010 |
| JP | 2010-282023 A | 12/2010 |
| JP | 2011-059488 | 3/2011 |
| JP | 2011-107198 | 6/2011 |
| JP | 2011-180252 | 9/2011 |
| JP | 2012-073637 A | 4/2012 |
| KR | 10-2007-0085246 | 8/2007 |
| KR | 10-200801018 | 11/2008 |
| KR | 10-2009-0098388 | 9/2009 |
| KR | 10-0951290 | 4/2010 |
| KR | 10-2011-0014515 | 2/2011 |
| TW | 2005000627 | 1/2005 |
| TW | 201139140 A | 11/2011 |
| TW | 201219861 A | 5/2012 |
| WO | WO/2011/058774 * | 5/2011 |
| WO | WO-2011/162198 | 12/2011 |

* cited by examiner

Average tilt angle θa (Kosaka Lab) Roughness curve

Standard length L $$\theta a = \tan^{-1}\left(\frac{h_1 + h_2 + h_3 + \cdots + h_n}{L}\right)$$

ANTIGLARE FILM, POLARIZER AND IMAGE DISPLAY DEVICE

CROSS REFERENCE TO RELATED APPLICATIONS

This application is claims priority to Application No. 2012-096105 filed in Japan on Apr. 19, 2012 and Application No. 2012-136356 filed in Japan on Jun. 15, 2012 under 35 U.S.C. §119; the entire contents of all are hereby incorporated by reference.

TECHNICAL FIELD

The present invention relates to an antiglare film, a polarizer, and an image display device.

BACKGROUND ART

Since having characteristics of being energy saving, lightweight, thin, and the like, liquid crystal display devices have been spread rapidly in recent years in place of conventional CRT displays.

Since such a liquid crystal display device has a polarizing element in the image display face side of a liquid crystal cell and generally, it is required to give hardness to the polarizing element for protecting the polarizing element from scratches at the time of handling, the image display face is commonly provided with hardness by using a hard coat film obtained by forming a hard coat layer on an optically transparent substrate as a polarizer protection film.

Conventionally, a film made of a cellulose ester typified by triacetyl cellulose has been employed as the optically transparent substrate of the hard coat film. It is based on advantageous properties of the cellulose ester: that is, as being excellent in transparency and optical isotropy and scarcely having in-plane phase difference (low retardation value), the cellulose ester extremely scarcely changes the vibration direction of incident linear polarization, scarcely affects on the display quality of a liquid crystal display device, has proper water permeability, and accordingly can dry out water remaining in a polarizing element through an optical layered body when the polarizer using the optical layered body is produced.

However, a cellulose ester film is a material disadvantageous in terms of the cost and is insufficient in moisture resistance and heat resistance and when a hard coat film is used as a protection film for a polarizer in high temperature and high humidity environments, the cellulose ester film adversely deteriorates the polarization function and polarizer function such as color phase.

Because of these problems of the cellulose ester film, it has been tried to use a polyester substrate of polyethylene terephthalate or the like which is excellent in transparency, heat resistance, and mechanical strength and a material economical as compared with the cellulose ester film, as a material for an optically transparent substrate in place of the cellulose ester film.

However, because having aromatic rings with high polarizability in the molecular chain, the polyethylene terephthalate film has extremely high intrinsic birefringence and tends to exhibit in-plane birefringence in the film along with orientation of the molecular chain by stretching treatment carried out for providing excellent transparency, heat resistance, and mechanical strength. Therefore, in the case where the polyethylene terephthalate film is put on a polarizing element, there is a problem that the liquid crystal display device shows nonuniformity with different colors (hereinafter, referred to also as "rainbow interference pattern") particularly when the display screen is viewed obliquely and the display quality of the liquid crystal display device is deteriorated.

As a trial of using a polyester substrate as a material for an optical substrate in place of a cellulose ester film, for example, Patent Literature 1 discloses a polarizer protection film, which is a film containing a polyester resin as a main component and made to have an in-plane retardation Re of 500 nm or higher. In the invention disclosed in Patent Literature 1, in order to provide the polyester film with sufficient mechanical strength, biaxial drawing is carried out at vertical and transverse draw ratio of 3.3/3.9 and the retardation is thus inevitably generated, and since the draw ratio is low and the vertical and transverse draw ratios are almost equal, the retardation value is at minimum 500 nm and at maximum 700 nm. However, with retardation of such a low level, the rainbow interference pattern problem cannot be solved. In the invention disclosed in Patent Literature 1, the rainbow interference pattern problem is solved by forming a light diffusion layer with a haze of 10 to 80% on the uppermost layer. Although the rainbow interference pattern can be solved by formation of the light diffusion layer having a haze of 10% or higher, there occurs another problem of image quality deterioration such as white muddiness or contrast.

For example, Patent Literature 2 discloses an antiglare film using a polyethylene terephthalate film drawn 2.5 to 6 times and having sufficient transparency as a transparent substrate. Regarding this antiglare film, if the retardation is 1000 or higher, the coloring is not noticeable in the front but the color nonuniformity (rainbow interference pattern) in an oblique direction cannot be solved and therefore, the rainbow interference pattern is solved by making the total haze at least 8 times as high as transmission clarity. However, if the transmission clarity is lower, the visibility is lowered so that the antiglare film disclosed in Patent Literature 2 is required to have a haze of 5.5 to 55%. Further, in order to satisfy the relationship between the transmission clarity and the haze, the specular reflectivity of an antiglare layer is made so extremely low as 0.05 to 2% by increasing the period of uneven forms on the surface of the antiglare layer and therefore, the antiglare film has few flat face and the rainbow interference pattern can be solved; however, it causes a problem of image quality deterioration such as white muddiness or contrast.

Patent Literature 3 discloses that good visibility regardless of the viewing angle can be attained when a screen is viewed through a polarizer such as sunglasses by using a white light-emitting diode as a light source and using and arranging a polymer film with a retardation of 3000 to 30000 nm in a manner that the angle formed between the absorption axis of the polarizer and the slow axis of the polymer film is at 45 degree. However, a polyester film or a polycarbonate film, which is a preferable polymer film in Patent Literature 3, is soft and has no scratching resistance and therefore, the polymer film cannot stand practical use unless a hard coat layer is formed on the surface of the polymer film. In the case where a hard coat layer is formed on the surface of the polymer film, if a refractive index difference between both becomes wide, interference fringes attributed to the refractive index difference are generated, resulting in image quality deterioration.

The interference fringes mean a phenomenon that when white light comes to a transparent thin film, the light reflected by the front face of the thin film and the light once incident on the thin film and reflected by the rear face thereafter are interfered with each other and seen like a partial rainbow color-like hue, and a phenomenon caused by change of mutually intensified wavelength depending on the viewing direction. This phenomenon is not only uncomfortable but also unpleasant for a user in some cases, and improvement is strongly required. In the case where a hard coat layer (refractive index: Nh) is formed on a polymer film (refractive index: Np) and Np and Nh are different (refractive index difference), for example, in the case where Np is 1.64 to 1.68 and Nh is 1.50 to 1.53, reflected light interference is caused in the interface of the polymer film and hard coat layer and the interference fringes are more significant as the refractive index difference is wider.

On the other hand, it has been known that the interference fringes can be solved by making the refractive indexes of the polymer film (refractive index: Np) and hard coat layer (refractive index: Nh) as even as possible (hereinafter, also referred to as interference fringe solution method 1). Further, an intermediate layer is formed between the polymer film and the hard coat layer (e.g., a primer layer for adhesiveness improvement) in some cases, and in this case, there is also a known technique of suppressing the interference fringes by adjusting the refractive index of the intermediate layer to a middle refractive index between the refractive index (Np) of the polymer film and the refractive index (Nh) of the hard coat layer (hereinafter, also referred to as interference fringe solution method 2) (e.g., see Patent Literatures 4 and 5). The middle refractive index (Nph) between the refractive index (Np) of the polymer film and the refractive index (Nh) of the hard coat layer can be calculated theoretically according to the following mathematical expression.

$$Nph=\sqrt{Np \cdot Nh}$$

That is, in the invention disclosed in Patent Literature 3, it is necessary to form a hard coat layer based on the above-mentioned interference fringe solution method 1 and to form an intermediate layer based on the above-mentioned interference fringe solution method 2 for interference fringe prevention.

CITATION LIST

Patent Literatures

Patent Literature 1: Japanese Kokai Publication 2008-003541
Patent Literature 2: Japanese Kokai Publication 2009-156938
Patent Literature 3: Japanese Kokai Publication 2011-107198
Patent Literature 4: Japanese Kokai Publication 2003-177209
Patent Literature 5: Japanese Kokai Publication 2004-345333

SUMMARY OF INVENTION

Technical Problem

However, in Patent Literature 3, since the polymer film is made to have a high retardation value, the refractive indexes in the vertical direction and transverse direction (hereinafter, referred to as Nx and Ny, respectively; where Np−Nx=Ny−Np) of the polymer film inevitably significantly differ from each other. Accordingly, the refractive index Nh of the hard coat layer cannot be determined in accordance with the above-mentioned interference fringe solution method 1 and even if Nh is made to be an average value of Nx and Ny, refractive index difference of |Nh−Nx| and |Nh−Ny| exist in the vertical and transverse directions, respectively, and therefore, the interference fringes cannot be solved. Similarly, since the refractive indexes in the vertical direction and the transverse direction differ from each other, the refractive index of the intermediate layer cannot be determined in accordance to the above-mentioned interference fringe solution 2 and even if the intermediate layer is made to have the optimum refractive index, interference fringes are inevitably generated. That is, unless the thickness of the polymer film is increased, the interference fringes become a more serious problem as the retardation is made higher and in Patent Literature 3, the problem of image quality deterioration due to the generation of interference fringes cannot be avoided.

In view of the above state of the art, regarding an image display device using a transparent substrate having an in-plane birefringence, it is an object to provide an antiglare film having a hard coat property, capable of highly suppressing generation of a rainbow interference pattern and interference fringes in display images, preventing white muddiness and scintillation of a display screen, and at the same time giving high contrast in a bright room and a dark room; a polarizer and an image display device each using the antiglare film.

Solution to Problem

The present invention provides an antiglare film including an antiglare layer having an uneven form on its surface and formed on one face of a transparent substrate having an in-plane birefringence, wherein the transparent substrate having an in-plane birefringence has a retardation of 3000 nm or higher; the antiglare layer contains silica fine particles, organic fine particles, and a binder resin; the silica fine particles include particles forming agglomerates to be contained coarsely and densely in the antiglare layer; and the agglomerates of the silica fine particles are distributed densely around the organic fine particles, and some of the agglomerates of the silica fine particles densely distributed around the organic fine particles adhere to the surfaces of the organic fine particles and/or some of the silica fine particles constituting the agglomerates are impregnated in the inside of the organic fine particle.

In the antiglare film of the present invention, it is preferable that the transparent substrate having an in-plane birefringence has a difference (nx−ny) of the refractive index (nx) in a slow axis direction, a direction with a high refractive index, and the refractive index (ny) in a fast axis direction, a direction orthogonal to the slow axis direction in a range of 0.05 to 0.20.

The silica fine particles are preferable to be surface-treated and the agglomerates of the silica fine particles are preferable to have an average particle diameter of 100 nm to 1 μm.

The binder resin is preferably obtained from a polyfunctional acrylate monomer having no hydroxyl group in the molecule as a main material.

The organic fine particles are preferably surface-hydrophilized.

The transparent substrate having an in-plane birefringence is preferably a polyester substrate.

The antiglare film of the present invention is preferable to have a total haze according to JIS K7136 of less than 5.0.

The present invention also provides a polarizer having a polarizing element, wherein the polarizer has the above-mentioned antiglare film on the polarizing element surface.

The present invention also provides an image display device having the above-mentioned antiglare film or the above-mentioned polarizer.

The image display device of the present invention is preferable to have a white light-emitting diode as a backlight light source.

Hereinafter, the present invention will be described in detail.

In the present invention, a curable resin precursor such as a monomer, an oligomer, or a prepolymer is also described as "resin", unless otherwise specified.

The present invention provides an antiglare film including an antiglare layer having an uneven form on its surface and formed on one face of a transparent substrate having an in-plane birefringence.

In the antiglare film of the present invention, since a thickness difference corresponding to the uneven form on its surface exists on the antiglare layer, it is made possible to finely subdivide the surface areas forming the same optical path difference for the interfering light generated by the light reflected on the surface of the antiglare layer and the light reflected on the interface in the transparent substrate side. Accordingly, in the antiglare film of the present invention, the interfering light is mixed so that the interference fringes cannot be recognized and the interference fringes can be prevented.

Herein, examples of conventionally known antiglare films on which an antiglare layer having an uneven form on its surface is formed are various types such as a type having an uneven form on the surface of the antiglare layer by agglomeration of particles such as cohesive silica; a type having an uneven form on the surface of the antiglare layer by adding an organic filler in a resin; a type for transferring an uneven form by laminating a film having unevenness on the surface of the antiglare layer; and the like. These conventional antiglare films are provided with a light diffusion and antiglare function based on the function of the surface form of the antiglare layer, regardless of the types, and in order to improve the function, it is required to make the uneven form coarse and intense and if the uneven form is made coarse and intense, the haze of a coating film (haze value) is increased to result in a problem of white muddiness, decrease of contrast of displayed images, etc.

Further, the conventional antiglare films generate twinkling brightness, so-called scintillation, on the film surface and it also results in a problem of deterioration of the visibility of a display screen. The scintillation is a phenomenon that fine brightness unevenness appears on a screen surface when an image display device is turned on and the transmitted light from the rear face reaches the screen, and the position of the brightness unevenness seems to be shifting if a viewer changes the viewing angle, and it is particularly noticeable in the case of full face white display and full face green display.

To deal with problems such as scintillation and white muddiness, for example, there is known an antiglare film for which occurrence of scintillation and white muddiness is suppressed while the hard coat property and the antiglare property are maintained by smoothing the fine uneven form on the antiglare layer surface with a resin in the hard coat layer and thereby making the intervals between convex parts wide and changing the height of the convex part of uneven form to be lower than before; however, the thickness becomes large such as 10 µm or more, and thus, it fails to sufficiently satisfy the recent requirement for thinning of an antiglare film.

For example, in the case where the uneven form is formed on the layer surface by using organic fine particles or inorganic fine particles alone, if an antiglare film is made thin, the fine particles often exist too much in the upper part of the antiglare layer or the fine particles are agglomerated in the height direction, so that the surface unevenness becomes high and scintillation and white muddiness are caused. To deal with such a defective point, if the average particle diameter of the organic fine particles or inorganic fine particles is made small to lower the height of the surface unevenness, the height of the surface unevenness tends to be rather too much lowered to keep the antiglare property and interference fringe prevention property, resulting in impossibility of stably obtaining high quality products.

Accordingly, it is desired to obtain an antiglare film having an antiglare layer with a mono-layer structure, which is an antiglare layer having a smooth uneven surface, keeps the hard coat property and the antiglare property, sufficiently suppresses scintillation and white muddiness in a bright room, and is excellent in contrast in a bright room and a dark room.

In view of the above-mentioned conventional problems and the problems of the antiglare film, the present inventors have made earnest investigations and consequently have found that occurrence of a rainbow interference pattern in a displayed image can be suppressed by making a transparent substrate such as a polyester substrate having an in-plane birefringence have a prescribed retardation value; the uneven form can be made smooth as compared with the uneven form on the surface of the antiglare layer containing merely one kind fine particles (e.g., organic fine particles) by adding silica fine particles and organic fine particles in a specified dispersion state to the antiglare layer, and as a result, it is made possible to obtain an antiglare film which is provided with sufficient specular reflectivity and proper dispersion, which is made thin while keeping the hard coat property, antiglare property, and an interference fringe prevention property, and which is sufficiently prevented from generation of scintillation and generation of white muddiness, and these findings have now led to completion of the present invention. Such an antiglare film of the present invention has a smooth uneven form on the antiglare layer surface, so that the film can be provided with an interference fringe prevention property by proper dispersion without increasing the haze and also with excellent black hue (high bright room and dark room contrast and performance of giving glossy and bright images).

The antiglare film of the present invention has an antiglare layer on a transparent substrate having an in-plane birefringence.

The above-mentioned transparent substrate having an in-plane birefringence is not particularly limited and examples thereof may be substrates made of polycarbonates, cycloolefin polymers, polyesters, etc., and especially, polyester substrates advantageous in terms of the cost and mechanical strength are preferable. In the following description, a polyester substrate is used as the transparent substrate having an in-plane birefringence for explanation.

The above-mentioned polyester substrate has a retardation of 3000 nm or higher. If the retardation is less than 3000 nm, a rainbow interference pattern is generated in a displayed image on a liquid crystal display device using the antiglare film of the present invention. On the other hand, the upper limit of the retardation of the above-mentioned polyester substrate is not particularly limited, but it is preferably about 30000 nm. If it exceeds 30000 nm, no further rainbow interference pattern improvement effect on a displayed image is caused and the thickness becomes rather large and therefore, it is not preferable.

The retardation of the above-mentioned polyester substrate is preferably 6000 to 25000 nm from the viewpoint of rainbow interference pattern prevention property and thinning. It is more preferably in a range of 8000 to 20000 nm.

The above-mentioned retardation can be expressed according to the following expression from the refractive index (nx) in the direction in a plane of the polyester substrate in which the refractive index becomes highest (slow axis direction), the refractive index (ny) in the direction orthogonal to the slow axis direction (fast axis direction), and the thickness (d) of the polyester substrate:

$$Retardation\ (Re) = (nx - ny) \times d$$

The above-mentioned retardation can be measured, for example, by KOBRA-WR manufactured by Oji Scientific Instruments (measurement angle 0°, and measurement wavelength 548.2 nm).

It can also be determined using two polarizers by measuring the orientation axis direction (main axis direction) of the polyester substrate and measuring refractive indexes (nx, ny) in two axes orthogonal to the orientation axis direction by an Abbe's refractometer (NAR-4T, manufactured by Atago Co., Ltd.). The thickness d (nm) of the polyester substrate can be measured using an electric micrometer (manufactured by Anritsu Corporation). The retardation can be calculated as a product of the refractive index difference (nx−ny) and the film thickness d (nm).

The value of the refractive index (n) can be determined by measuring the average reflectance (R) using a spectrophotometer (UV-3100 PC, manufactured by SHIMADZU CORPORATION) in a wavelength range of 380 to 780 nm to determine the value according to the following expression from the obtained average reflectance (R).

The average reflectance (R) of the antiglare layer or a primer layer described below is measured by applying each raw material composition (in the case of the antiglare layer, excluding silica fine particles and organic fine particles) to a 50 μm PET without treatment for easy adhesion to form a cured film with a thickness of 1 to 3 μm; sticking a black vinyl tape (e.g., Yamato vinyl tape NO200-38-21, 38 mm width) with a wider width than the measurement spot surface area to the face (rear face) in which the PET is not applied for preventing reflection by the rear face; and then carrying out the measurement of the average reflectance of each coating film. The refractive index of the polyester substrate is measured after a black vinyl tape is stuck similarly to the reverse face of the measurement face.

$$R(\%) = (1-n)^2 / (1+n)^2$$

A method for measuring the refractive index of the antiglare layer after the antiglare layer is included in the antiglare film may be carried out by scraping the cured film of each layer with a cutter or the like to produce a sample in a powder state and employing a Beck method (using Cargill reagents with known refractive indexes, setting the above-mentioned each sample in a powder state on a slide glass or the like; dropping each of reagents on the sample to immerse the sample with the reagent; observing the situation with a microscope; and determining the refractive index of the reagent with which the Becke line, that is, a bright line, generated in the outline of the sample because of the difference of the refractive indexes of the sample and the reagent cannot be observed as the refractive index of the sample) according to the B method in JIS K7142 (2008) (for a powder or granular transparent material).

In the present invention, the above mentioned nx−ny (hereinafter, also expressed as Δn) is preferably 0.05 to 0.20. If the above-mentioned Δn is lower than 0.05, the rainbow interference pattern cannot be suppressed sufficiently in some cases, and the film thickness required to obtain the above-mentioned retardation value becomes large in some cases. On the other hand, if the above-mentioned Δn exceeds 0.20, the polyester substrate tends to be easily split and torn, and practical applicability as an industrial material is considerably lowered in some cases.

The lower limit of the above-mentioned Δn is more preferably 0.07 and the upper limit thereof is more preferably 0.15. It is because if the Δn is smaller than 0.07, the rainbow interference pattern prevention effect is hardly caused when the slow axis is set at 0° or 90° to the polarizer absorption axis. If the above-mentioned Δn exceeds 0.15, the durability of the polyester substrate becomes inferior in a hygrothermal resistance test in some cases. The upper limit of the above-mentioned Δn is further preferably 0.12 since it leads to excellent durability in the hygrothermal resistance test.

The above-mentioned (nx) is preferably 1.67 to 1.78 and the lower limit is more preferably 1.69 and the upper limit is more preferably 1.73. The above-mentioned (ny) is preferably 1.55 to 1.65 and the lower limit is more preferably 1.57 and the upper limit is more preferably 1.62.

A preferable effect of suppressing the rainbow interference pattern can be caused by keeping the nx and the ny within the above-mentioned ranges and the above-mentioned relation of Δn is satisfied.

A material constituting the polyester substrate is not particularly limited if the above-mentioned retardation is satisfied and examples thereof are linear saturated polyesters synthesized from aromatic bibasic acids or their ester-formable derivatives in combination with diols or their ester-formable derivatives. Specific examples of the polyester may include polyethylene terephthalate, polyethylene isophthalate, polybutylene terephthalate, poly(1,4-cyclohexylenedimethylene terephthalate), and polyethylene-2,6-naphthalate.

Polyesters to be used for the polyester substrate may be copolymers of the above-mentioned polyesters, or may also be blends containing mainly the above-mentioned polyesters (e.g., at least 80% by mole components) and a small ratio of other kinds of resins (e.g., 20% by mole or less). Since having mechanical properties, optical properties, etc. in good balance, polyethylene terephthalate or polyethylene-2,6-naphthalate is particularly preferable as the polyester. Particularly, a substrate made of polyethylene terephthalate (PET) is preferable, because polyethylene terephthalate is highly versatile and easily available. In the present invention, even a film with extremely high versatility like PET can be used for obtaining an antiglare film capable of producing a liquid crystal display device with high display quality. PET is excellent in transparency and thermal- or mechanical-properties, easy to have controlled retardation by stretching, has high intrinsic birefringence, and relatively easily gives high retardation even for thin thickness.

A method for obtaining the polyester substrate is not particularly limited if it is a method for satisfying the above-mentioned retardation and an example thereof includes a method of melting a polyester such as PET or those described above as a material, extrusion-molding the melt into a sheet-like unstretched polyester, transversely stretching the resulting polyester at a temperature equal to or higher than the glass transition temperature using a tenter etc., and carrying out heat treatment.

The temperature of the transverse stretching is preferably 80 to 130° C. and more preferably 90 to 120° C. The transverse stretching ratio is preferably 2.5 to 6.0 times and more preferably 3.0 to 5.5 times. If the transverse stretching ratio exceeds 6.0 times, the transparency of the polyester substrate to be obtained is easily lowered and if the transverse stretching ratio is lower than 2.5 times, the orientation tensile is also lowered and the birefringence of the polyester substrate to be obtained becomes small and it results in impossibility of adjusting the retardation to 3000 nm or higher in some cases.

In the present invention, after the transverse stretching of the unstretched polyester in the above-mentioned condition, stretching in the flow direction to the transverse stretching (hereinafter, also referred to as vertical stretching) may be carried out using a biaxial stretching test device. In this case, the stretching ratio of the vertical stretching is preferably 2 times or lower. If the stretching ratio of the vertical stretching exceeds 2 times, the value of Δn cannot be kept in the above-mentioned preferable range in some cases.

The treatment temperature at the time of the heat treatment is preferably 100 to 250° C. and more preferably 180 to 245° C.

Examples of a method for controlling the retardation of a polyester substrate produced by the above-mentioned method to 3000 nm or higher include methods for properly setting the stretching ratio, stretching temperature, thickness of the polyester substrate to be produced. Specifically, for example, as the stretching ratio is higher, as the stretching temperature is lower, and as the thickness is larger a higher retardation can be obtained easily and as the stretching ratio is lower, as the stretching temperature is higher, and as the thickness is thinner, a lower retardation can be obtained easily.

The thickness of the polyester substrate is preferably in a range of 40 to 500 μm. If it is thinner than 40 μm, the retardation of the polyester substrate cannot be 3000 nm or higher and also the anisotropy of mechanical properties becomes significant; tearing, splitting, etc. tend to be caused easily; and practical applicability as an industrial material is considerably lowered in some cases. On the other hand, if it exceeds 500 μm, the polyester substrate becomes very rigid and the softness peculiar for a polymer film is lowered and practical applicability as an industrial material is also lowered and thus it is not preferable. The lower limit of the thickness of the above-mentioned polyester substrate is more preferably 50 μm and the upper limit is more preferably 400 μm and still more preferably 300 μm.

The above-mentioned polyester substrate has a transmittance of preferably 80% or higher and more preferably 84% or higher in a visible light region. The above-mentioned transmittance can be measured according to JIS K7361-1 (Plastics—Testing method of total light transmittance of transparent materials).

In the present invention, the above-mentioned polyester substrate may be subjected to surface treatment such as saponification treatment, glow discharge treatment, corona discharge treatment, ultraviolet (UV) treatment or flame treatment without departing from the gist of the present invention.

The above-mentioned antiglare layer is formed on one face of the polyester substrate and has an uneven form on its surface.

The antiglare layer contains silica fine particles, organic fine particles, and a binder resin and the uneven form on its surface is formed by agglomerates of the silica fine particles and organic fine particles described below.

The antiglare film of the present invention has the uneven form formed on the surface of the antiglare layer and the slope of the convex part is moderate and smooth as compared with that of the uneven form formed on the surface of the antiglare layer containing merely one kind fine particles (e.g., organic fine particles or the like) or agglomerates of one kind particles (e.g., agglomerates of silica fine particles). That is supposedly attributed to that the silica fine particles and the organic fine particles are distributed in a specified state in the antiglare layer in the case of the antiglare film of the present invention.

In the antiglare film of the present invention, the silica fine particles include particles forming agglomerates to be contained coarsely and densely in the antiglare layer. Since the above-mentioned agglomerates of the silica fine particles are distributed coarsely and densely in the antiglare layer, the smooth uneven form is formed on the antiglare layer surface.

The above-mentioned "distributed coarsely and densely in the antiglare layer" means that there are a plurality of regions where the agglomerates of the silica fine particles are distributed densely (in the case where an arbitrary cross section in the thickness direction of the antiglare layer is observed in the condition of 10000 magnification by an electron microscope (a transmission type such as TEM or STEM is preferable), the regions in which the surface area ratio of the agglomerates of the silica fine particles occupying in the observation region of 2 μm square is 5% or higher) and a plurality of regions where the agglomerates of the silica fine particles are distributed coarsely (in the case where an arbitrary cross section in the thickness direction of the antiglare layer is observed in the condition of 10000 magnification by an electron microscope (a transmission type such as TEM or STEM is preferable), the regions in which the surface area ratio of the agglomerates of the silica fine particles occupying in the observation region of 2 μm square is less than 1%). In other words, the agglomerates of the silica fine particles are dispersed unevenly in the above-mentioned antiglare layer.

Such distribution of the agglomerates of the silica fine particles can easily be distinguished by electron microscopic observation of a cross section in the thickness direction of the above-mentioned antiglare layer. For example, FIG. 2 is an STEM photograph of a cross section of an antiglare film of Example 1, and in FIG. 2, the dark color band-like region near the center is a cross section of the antiglare layer and in the cross section of the antiglare layer, the portions seen as black spots show the agglomerates of the silica fine particles and it can apparently confirmed that the agglomerates of silica fine particles are unevenly dispersed in the antiglare layer. The surface area ratio of the agglomerates of the silica fine particles can be calculated using, for example, image analysis software.

In the antiglare film of the present invention, the silica fine particles are preferable to be surface-treated. The surface treatment of the silica fine particles can preferably control the degree of coarse and dense distribution of the agglomerates of the silica fine particles in the antiglare layer and also can control the effect of the dense distribution around the organic fine particles to a proper range. It can also improve the chemical resistance and saponification resistance of the silica fine particles themselves.

Examples of the surface treatment include a method for treating the silica fine particles with a silane compound having an octyl group, and the like.

Generally, hydroxyl groups (silanol groups) exist in the surface of the silica fine particle and execution of the above-mentioned surface treatment decreases the hydroxyl groups in the silica fine particle surfaces, narrows the specific surface area of the silica fine particles measured by a BET method, prevents the silica fine particles from agglomeration to an excess extent, and causes the above-mentioned effects.

The silica fine particles are preferably made of amorphous silica. In the case where the silica fine particles are made of crystalline silica, the Lewis acidity of the silica fine particles is so intensified owing to the lattice defects contained in the crystal structure as to make it impossible to control the excess agglomeration of the silica fine particles in some cases.

As the silica fine particles, for example, fumed silica is preferably used since the silica itself tends to easily agglomerate and thus is easy to form agglomerates as described below. The above-mentioned fumed silica means amorphous silica produced by a dry method and having a particle diameter of 200 nm or smaller and is obtained by vapor phase reaction of a silicon-containing volatile compound. Specifically, examples thereof include those produced by hydrolyzing a silicon compound, e.g., $SiCl_4$, in flames of oxygen and hydrogen. Specifically, examples thereof include AEROSIL R805 (produced by Nippon Aerosil, Co., Ltd.) and the like.

The content of the silica fine particles is not particularly limited and preferably 0.1 to 5.0 wt % in the above-mentioned antiglare layer. If it is less than 0.1 wt %, the above-mentioned dense distribution around the organic fine particles cannot be formed in some cases and if it exceeds 5.0 wt %, agglomerates are formed to an excess extent and it leads to the inner diffusion and/or significant unevenness in the antiglare layer and thus causes a problem of white muddiness. The lower limit is more preferably 0.5 wt % and the upper limit is more preferably 3.0 wt %.

The silica fine particles are preferable to have an average primary particle diameter of 1 to 100 nm. If it is smaller than 1 nm, the above-mentioned dense distribution around the organic fine particles cannot be formed in some cases and if it is larger than 100 nm, besides that the above-mentioned dense distribution around the organic fine particles cannot be formed in some cases, light is diffused by the silica fine particles and the dark room contrast of an image display device using the antiglare film of the present invention may be inferior in some cases. The lower limit is more preferably 5 nm and the upper limit is more preferably 50 nm.

The above-mentioned average primary particle diameter of the silica fine particles is a value measured from an image of a cross section by an electron microscope (a transmission type such as TEM or STEM and magnification is preferably 50000) by using image processing software.

In the present invention, the agglomerates of the silica fine particles form a structure in the above-mentioned antiglare layer in which the silica fine particles are arranged side by side in beaded shape (like a necklace of pearls).

Since the silica fine particles are arranged side by side in beaded shape to form the agglomerates in the antiglare layer, the surface unevenness of the antiglare layer is made to have a desirable smooth form as described below.

Examples of the structure in which the silica fine particles are arranged side by side in beaded shape include arbitrary structures such as a structure (a linear structure) in which the silica fine particles are linearly and continuously arranged side by side; a structure formed by entwisting a plurality of the linear structures; a branched structure having one or more side chains formed by continuously arranging a plurality of silica fine particles in the linear structure; and the like.

The agglomerates of the silica fine particles are preferable to have an average particle diameter of 100 nm to 1 μm. If it is smaller than 100 nm, the above-mentioned dense distribution around the organic fine particles cannot be formed in some cases and if it is larger than 1 μm, besides that the above-mentioned dense distribution around the organic fine particles cannot be formed in some cases, light is diffused by the silica fine particles and the dark room contrast of an image display device using the antiglare film of the present invention may be inferior in some cases. The lower limit of the average particle diameter of the agglomerates is more preferably 200 nm and the upper limit is more preferably 800 nm.

The average particle diameter of the agglomerates of the silica fine particles is obtained by selecting a region of 5 μm square containing many agglomerates of the silica fine particles by observation with a cross-sectional electron microscope (about 10000 to 20000 magnification); measuring the particle diameters of the agglomerates of the silica fine particles in the region; and averaging the particle diameters of the agglomerates of the upper 10 silica fine particles. The above-mentioned "particle diameter of the agglomerates of the silica fine particles" is measured as a maximum inter-line distance of a combination of two straight lines in the case where a cross section of an agglomerate of the silica fine particles is sandwiched with two arbitrary parallel straight lines. The particle diameter of the agglomerates of the silica fine particles may be calculated using image analysis software.

The antiglare film of the present invention contains organic fine particles in the antiglare layer and the agglomerates of the silica fine particles are distributed densely around the organic fine particles.

Additionally, as described above, since the agglomerates of the silica fine particles are coarsely and densely contained in the antiglare layer, in the antiglare layer, regions where a large number of the agglomerates of the silica fine particles exist around the organic fine particles and regions where only the agglomerates of the silica fine particles exist densely are formed. For example, FIG. 4 is a cross-sectional microscopic photograph of an antiglare layer of an antiglare film of Example 2 and as shown in FIG. 4, the state that agglomerates of silica fine particles are densely distributed around organic fine particles can be easily confirmed by observation of a cross section of the antiglare layer with an electron microscope.

In the case where the cross section of the antiglare layer is observed by an electron microscope, it is observed that the agglomerates of the silica fine particles distributed densely around the organic fine particles exist not only in the cross sections penetrating the centers of the organic fine particles but also in the cross sections shifted from the centers of the organic fine particles.

The above-mentioned "agglomerates of the silica fine particles distributed densely around the organic fine particles" means a state that the surface area ratio of the agglomerates of the silica fine particles to the region which is within a 200 nm outside the organic fine particles and from which the organic fine particles are removed is 10% or higher when a cross section in the thickness direction of the antiglare layer and in which the organic fine particles exist is observed with an electron microscope (a transmission type such as TEM or STEM is preferable) in the condition of 20000 magnification.

In the antiglare film of the present invention, the agglomerates of the silica fine particles densely distributed around the organic fine particles adhere to the surface of the organic fine particle and/or some of the silica fine particles constituting the agglomerates are impregnated in the inside of the organic fine particle (hereinafter, the agglomerates of such silica fine particles are referred to also as agglomerates adhering to the surface of the organic fine particle, etc.). Since the agglomerates of the silica fine particles adhere to the surface of the organic fine particle, etc., the cohesive force working among the agglomerates of the silica fine particles adhering to different organic fine particles is utilized to gather the different organic fine particles. Therefore, even if the addition amount of the organic fine particles is slight, an uneven form having sufficient antiglare property can be formed.

In addition, to gather the organic fine particles does not mean the case where organic fine particles completely adhere to one another, but means the case where the distance between most adjacent organic fine particles is smaller than the average particle diameter of the particles when a cross section of the antiglare layer is observed, or the case where, for example, a plurality of the agglomerates of the silica fine particles are continuously arranged side by side between organic fine particles like the organic fine particles contained in the upper center and the organic fine particles contained in the lower right side as show in FIG. 4.

FIG. 3 is a enlarged microscopic photograph of the cross-sectional microscopic photograph of an antiglare layer of an antiglare film of Example 1 shown in FIG. 2, and as shown in FIG. 3, the agglomerates of the silica fine particles adhering to the organic fine particles, etc. can be easily confirmed by observation of the cross section of the antiglare layer with an electron microscope.

Examples of a method for attaching the agglomerates of the silica fine particles to the surface of the organic fine particle include a method for hydrophilization treatment of the surface of the organic fine particle as described below, and the like.

Examples of a method for impregnating some of the silica fine particles constituting the agglomerates of the silica fine particles in the inside from the surface of the organic fine particle include a method for lowering the crosslinking degree of the organic fine particles at the time of forming the antiglare layer, a method for using a solvent which can swell the organic fine particles in a composition for the antiglare layer, and the like.

The organic fine particles are preferable to attach the agglomerates of the silica fine particles evenly on the almost entire surface, etc.

The ratio of the agglomerates of the silica fine particles adhering to the surface of the organic fine particle, etc. to the agglomerates of the silica fine particles densely distributed around the organic fine particles is preferable to satisfy that the surface area ratio of the agglomerates of the silica fine particles to the region which is within 200 nm outside the organic fine particles and from which the organic fine particles are removed is 50% or higher when a cross section in the thickness direction of the antiglare layer and in which the organic fine particles exist is observed with an electron microscope (a transmission type such as TEM or STEM is preferable) in the condition of 20000 magnification. If it is lower than 50%, the effect of gathering the organic fine particles one another in the antiglare layer becomes insufficient and it becomes impossible to form unevenness having sufficient antiglare prevention performance and interference fringe prevention performance in some cases.

In the case where some of the silica fine particles constituting the agglomerates of the silica fine particles are impregnated in the surface of the organic fine particle, the agglomerates of the silica fine particles are preferable to be impregnated up to 500 nm from the surface of the organic fine particle. In order to impregnate the silica fine particles constituting the agglomerates of the silica fine particles more than 500 nm from the surface of the organic fine particle, it is necessary to swell the organic fine particles to an excess extent and thus a composition for the antiglare layer may have increased viscosity or may become gel, resulting in impossibility of forming a uniform coating in some cases. Further, the antiglare layer with a moderate uneven form as described below cannot be formed on its surface in some cases.

If the antiglare layer contains the agglomerates formed by arranging the silica fine particles side by side in beaded shape and the organic fine particles in such a specified state, the antiglare layer in the antiglare film of the present invention is provided with convex parts each having more moderated slope and with smoother form than those of the uneven form formed by merely one kind fine particles or their agglomerates. As a result, the antiglare film of the present invention can improve bright room- and dark room contrast while keeping the antiglare property and the interference fringe prevention performance. Since the uneven form formed on the surface of the antiglare layer has a moderate slope of the convex part and is made smooth, only the edge parts of an image reflected on the surface of the antiglare layer can be made unclear and invisible and the antiglare property is secured. An optical path difference for the interfering light generated by the light reflected on the surface of the antiglare layer and the light reflected on the interface of the antiglare layer in the transparent substrate side is provided, so that the interference fringe prevention property is secured. Since the antiglare layer having such an uneven form can prevent significant diffusion, stray light emission can be prevented and direct transmission is allowed to have a proper extent and thus bright images excellent in the bright room- and dark room contrast (excellent black hue) can be formed.

That is supposedly attributed to the following reasons.

That is, in the case where the composition for the antiglare layer is applied and dried to evaporate the solvent, if the viscosity is low, the binder resin tends to follow the form of the organic fine particles. Further, the volume of the binder resin is shrunk at the time of curing by cross-linked, but the organic fine particles are not shrunk and the convex parts formed at positions corresponding to the organic fine particles on the surface tend to be steep because of shrinkage of only the binder resin.

However, since the agglomerates of the silica fine particles are densely distributed around the organic fine particles, the viscosity of the composition for the antiglare layer around the organic fine particles is increased and the binder resin hardly follows the form of the organic fine particles when the solvent is evaporated and also the binder (made of the binder resin and the silica fine particles) in such parts is hard to cross-linked curing shrinkage and as a result, the convex parts formed at the positions corresponding to the organic fine particles on the surface tend to form moderate slope.

Accordingly, it is supposed that the tilt angle of the uneven form (convex part) formed on the surface of the antiglare layer by the organic fine particles becomes more moderate than the uneven form (convex part) formed only by one kind fine particles.

The organic fine particles are preferable to be fine particles which mainly form the uneven form on the surface of the antiglare layer and have relatively uniform particle diameters, and the agglomerates of the silica fine particles are coarsely and densely distributed in the antiglare layer as described above and are preferable to have particle diameters in a relatively wide range of dispersion in the antiglare layer. Since the antiglare layer contains two types of fine particles having particle diameters in the above mentioned relation, the antiglare film of the present invention tends to constitute a structure of the antiglare layer in which the agglomerates of the silica fine particles having particle diameters in a relatively wide range of dispersion enter into gaps among the organic fine particles having uniform particle diameters and thus the above-mentioned smooth uneven form can be formed preferably on the antiglare layer surface.

Herein, the above-mentioned "fine particles with relatively uniform particle diameters" means the case where $(d75-d25)/MV$ is 0.25 or lower and the above-mentioned "agglomerates with particle diameters in a relatively wide range of dispersion" means the case where $(d75-d25)/MV$ exceeds 0.25, wherein MV is the average particle diameter of fine particles based on weight average; $d25$ is 25% accumulative diameter; and $d75$ is 75% accumulative diameter. The 25% accumulative diameter means a particle diameter measured at 25 wt % of particles counted from the smaller particle diameter side in particle diameter distribution and the 75% accumulative diameter means a particle diameter measured at 75 wt % of particles counted in the same manner. The average particle diameter of the fine particles based on weight average, the 25% accumulative diameter, and the 75% accumulative diameter are measured as weight average particle diameter by a Coulter counter method.

In the antiglare layer, the organic fine particles and the silica fine particles are preferable to have spherical shapes in a single particle state. If the organic fine particles and the silica fine particles each have such a spherical shape in a single particle state, in the case where the antiglare film of the present invention is used for an image display device, displayed images with high contrast can be obtained.

The above-mentioned "spherical" means a truly spherical shape, an elliptical shape or the like, but excludes so-called an amorphous form.

The organic fine particles are mainly fine particles which form the surface uneven form of the antiglare layer and of which the refractive index and the particle diameter are easy to be controlled. Addition of such organic fine particles makes the size of the uneven form to be formed on the antiglare layer and the refractive index of the antiglare layer easily controllable, controls the antiglare property and the interference fringe preventing property, and suppresses occurrence of scintillation and white muddiness.

The organic fine particles are preferably fine particles made of at least one kind material selected from the group consisting of acrylic resins, polystyrene resins, styrene-acrylic copolymers, polyethylene resins, epoxy resins, silicone resins, polyvinylidene fluoride resins, and polyethylene fluoride resins. Especially, styrene-acrylic copolymer fine particles are preferably used.

The organic fine particles are preferably surface-hydrophilized. If the organic fine particles are surface-hydrophilized, the affinity with the silica fine particles can be improved and the agglomerates of the silica fine particles can adhere to the surface of the organic fine particle, etc. It is made easy to distribute the agglomerates of the silica fine particles densely around the organic fine particles.

Examples of a method for the hydrophilizing treatment are not particularly limited and include known methods such as a method for copolymerizing monomers having a functional group such as a carboxyl group or a hydroxyl group on the surface of the organic fine particle.

In general, the surface-hydrophilized organic fine particles cannot be gathered moderately in the antiglare layer, and therefore a sufficient uneven form cannot be formed on the surface of the antiglare layer and the antiglare performance and the interference fringe prevention performance are to be deteriorated. However, in the present invention, the agglomerates of the silica fine particles are formed and coarsely and densely contained in the antiglare layer and further the agglomerates of the silica fine particles are distributed densely around the organic fine particles, so that a desired uneven form can be formed even in the antiglare layer containing the surface-hydrophilized organic fine particles.

The content of the organic fine particles is preferably 0.5 to 10.0 wt % in the above-mentioned antiglare layer. If it is less than 0.5 wt %, the antiglare performance and the interference fringe prevention performance become insufficient in some cases and if it exceeds 10.0 wt %, a problem of white muddiness may be caused in some cases and displayed images may be inferior in contrast in the case where the antiglare film of the present invention is used for an image display device in some cases. The lower limit is more preferably 1.0 wt % and the upper limit is more preferably 8.0 wt %.

The size of the organic fine particles is determined properly in accordance with the thickness of the antiglare layer or the like and for example, the average particle diameter is preferably 0.3 to 5.0 µm. If it is smaller than 0.3 µm, it is possible that the dispersibility of the organic fine particles cannot be controlled and if it is larger than 5.0 µm, the uneven form on the antiglare layer surface becomes significant and a scintillation problem may possibly be caused in some cases. The lower limit is more preferably 1.0 µm and the upper limit is more preferably 3.0 µm.

The average particle diameter of the organic fine particles is preferably 20 to 60% to the thickness of the antiglare layer. If it exceeds 60%, the organic fine particles may possibly be projected out of the outermost surface of the coating layer and the unevenness formed by the organic fine particles may possibly become steep. If it is less than 20%, a sufficient uneven form cannot be formed on the antiglare layer surface and the antiglare performance and the interference fringe prevention performance become insufficient in some cases.

The average particle diameter of the organic fine particles can be measured as a weight average diameter by a Coulter counter method in the case where the organic fine particles are measured alone. On the other hand, the average particle diameter of the organic fine particles in the antiglare layer can be measured as the average value of the maximum diameters of 10 particles in transmission optical microscopic observation of the antiglare layer. Alternatively, if it is unsuitable, it is a value calculated in a manner of selecting 30 dispersed particles (the number n is increased since which portions of which particles are observed in the cross section are unclear) which seem to be of the same arbitrary type and to have almost the same particle diameter in a cross section passing near the particle center by observation with an electron microscope (a transmission type such as TEM or STEM is preferable); measuring the maximum particle diameters in the cross section; and calculating the average. Since both are determined from images, the calculation may be done by using image processing software.

The thickness of the antiglare layer is preferably 2.0 to 7.0 µm. If it is smaller than 2.0 µm, the surface of the antiglare layer tends to be scratched easily in some cases and if it is larger than 7.0 µm, the antiglare layer tends to be cracked easily in some cases. The thickness of the antiglare layer is more preferably in a range of 2.0 to 5.0 µm. The thickness of the antiglare layer can be measured by observation with a cross sectional microscope or can be also measured simply by a contact type thickness meter.

In the antiglare layer, the above-mentioned silica fine particles and the organic fine particles are dispersed in a binder resin. The above-mentioned binder resin is preferably obtained from a polyfunctional acrylate monomer having no hydroxyl group in the molecule as a main material. The above-mentioned "a polyfunctional acrylate monomer having no hydroxyl group in the molecule as a main material" means that the content of the polyfunctional acrylate monomer having no hydroxyl group in the molecule is highest among raw material monomers of the binder resin. Since the above-mentioned polyfunctional acrylate monomer having no hydroxyl group in the molecule is a hydrophobic monomer, the binder resin constituting the antiglare layer is preferably a hydrophobic resin in the antiglare film of the present invention. If a hydrophilic resin having a hydroxyl group is a main for the binder resin, a solvent with high polarity as described below (e.g., isopropyl alcohol) is hard to be evaporated and the above-mentioned silica fine particles are difficult to adhere to and/or immersed in the organic fine particles.

Because of that, agglomeration of only silica fine particles is subsequently promoted and it may result in formation of convex parts which may be possibly worsen the scintillation on the surface of the antiglare layer.

Examples of the polyacrylate monomer having no hydroxyl group in the molecule include pentaerythritol tetraacrylate (PETTA), 1,6-hexanediol diacrylate (HDDA), dipropyleneglycol diacrylate (DPGDA), tripropyleneglycol diacrylate (TPGDA), PO-modified neopentylglycol diacrylate, tricyclodecanedimethanol diacrylate, trimethylolpropane triacrylate (TMPTA), trimethylolpropane ethoxytriacrylate, dipentaerythritol hexaacrylate (DPHA), pentaerythritol ethoxy tetraacrylate, ditrimethylolpropane tetraacrylate, and the like. Especially, pentaerythritol tetraacrylate (PETTA) is preferably used.

Other binder resins are preferably transparent resins and, for example, those obtained by curing ionizing radiation-curable resins, which are cured by ultraviolet rays or electron beams, by ultraviolet rays or electron beam radiation.

In this specification, "resin" means a concept including monomers, oligomers, polymers, etc. unless otherwise specified.

Examples of the ionizing radiation-curable resins include compounds having one or more unsaturated bonds such as compounds having functional groups such as acrylates. Examples of compounds having one unsaturated bond include ethyl (meth)acrylate, ethyl hexyl (meth)acrylate, styrene, methylstyrene, N-vinylpyrrolidone, and the like. Examples of compounds having two or more unsaturated bonds include polyfunctional compounds such as trimethylolpropane tri(meth)acrylate, tripropyleneglycol di(meth)acrylate, diethyleneglycol di(meth)acrylate, pentaerythritol tri(meth)acrylate, dipentaerythritol hexa(meth)acrylate, 1,6-hexanediol di(meth)acrylate, neopentylglycol di(meth)acrylate, trimethylolpropane tri(meth)acrylate, ditrimethylolpropane tetra(meth)acrylate, pentaerythritol tetra(meth)acrylate, dipentaerythritol penta(meth)acrylate, tripentaerythritol octa(meth)acrylate, tetrapentaerythritol deca(meth)acrylate, isocyanuric acid tri(meth)acrylate, isocyanuric acid di(meth)acrylate, polyester tri(meth)acrylate, polyester di(meth)acrylate, bisphenol di(meth)acrylate, diglycerin tetra(meth)acrylate, adamantyl di(meth)acrylate, isobornyl di(meth)acrylate, dicyclopentane di(meth)acrylate, tricyclodecane di(meth)acrylate, and the like. In this specification, "(meth)acrylate" means methacrylate and acrylate. In the present invention, as the above-mentioned ionizing-radiation curable resin, those obtained by modifying the above-mentioned compounds with PO, EO, or the like are also usable.

Besides the compounds, polyester resins, polyether resins, acrylic resins, epoxy resins, urethane resins, alkyd resins, spiroacetal resins, polybutadiene resins, polythiol-polyene resins, and the like having relatively low molecular weights and having unsaturated double bonds are also usable as the above-mentioned ionizing-radiation curable resin.

The above-mentioned ionizing-radiation curable resin can be used in combination with a solvent-drying type resin (resins such as a thermoplastic resin which can form a coating film merely by drying out a solvent added for adjusting the solid matter at the time of coating). In combination use of the solvent-drying type resin, at the time of forming the antiglare layer, coating film defects on a coating solution-applied face can be effectively prevented.

The solvent-drying type resin to be used in combination with the above-mentioned ionizing-radiation curable resin is not particularly limited and generally, a thermoplastic resin can be used.

The thermoplastic resin is not particularly limited and examples thereof may include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, rubber and elastomer, and the like. The thermoplastic resin is preferably non-crystalline and soluble in an organic solvent (a common solvent in which a plurality of polymers and curable compounds can be dissolved). Form the viewpoint of film formability, transparency, and weathering resistance, styrene resins, (meth)acrylic resins, alicyclic olefin resins, polyester resins, cellulose derivatives (cellulose esters, etc.), and the like are preferable.

The above-mentioned antiglare layer may further contain a thermosetting resin.

The thermosetting resin is not particularly limited and examples thereof may include phenol resins, urea resins, diallyl phthalate resins, melamine resins, guanamine resins, unsaturated polyester resins, polyurethane resins, epoxy resins, aminoalkyd resins, melamine-urea co-condensed resins, silicon resins, polysiloxane resins, and the like.

The above-mentioned antiglare layer containing the silica fine particles, the organic fine particles, and the binder resin can be formed by, for example, applying a composition for the antiglare layer containing the silica fine particles, the organic fine particles, and the monomer components for the binder resin, and the solvent to a polyester substrate; drying the composition to form a coating film; and curing the coating film with ionizing radiation beams or the like.

In the composition for the antiglare layer, the silica fine particles form the above-mentioned agglomerates in the composition and are preferable to be evenly dispersed, preferable to be distributed coarsely and densely when the coating film is dried, and further preferable to be distributed densely around the organic fine particles. It is because if the agglomerates of the silica fine particles in the composition for the antiglare layer are not dispersed evenly, agglomeration is promoted to an excess extent in the composition for the antiglare layer and the silica fine particles form huge agglomerates and it consequently becomes impossible to form the above-mentioned antiglare layer having a smooth uneven form.

Herein, since the silica fine particles are a material which can increase the viscosity of the composition for the antiglare layer, sedimentation of the organic fine particles contained in the composition for the antiglare layer can be suppressed by adding the silica fine particles. That is, it is supposed that the silica fine particles have a function of promoting prescribed distribution of the organic fine particles and the agglomerates of the silica fine particles and also a function of improving the pot-life of the composition for the antiglare layer.

Examples of a method for evenly dispersing the silica fine particles in the form of agglomerates in the composition for the antiglare layer and distributing the agglomerates of the silica fine particles coarsely and densely in the coating and densely around the organic fine particles include methods of adding a prescribed amount of a solvent having high polarity and high evaporation speed as a solvent to be added to the composition for the antiglare layer. Addition of such a solvent having high polarity and high evaporation speed can prevent the agglomerates of the silica fine particles from agglomeration to an excess extent in the composition for the antiglare layer. On the other hand, at the time of forming a coating film by application of the composition to the polyester substrate, followed by drying, the solvent having high polarity and high evaporation speed can be evaporated prior to other solvents and the composition is changed at the time of coating film formation and as a result, the agglomerates of the silica fine particles are gathered around the organic fine particles in the coating film and the agglomerates of the silica fine particles are gathered together to form the state that the agglomerates of the silica fine particles are coarsely and densely distributed and densely distributed around the organic fine particles.

In this specification, "a solvent with high polarity" means a solvent with a solubility parameter of 10 $[(cal/cm^3)^{1/2}]$ or higher and "a solvent with high evaporation speed" means a solvent with a relative evaporation speed of 150 or higher. Accordingly, the above-mentioned "solvent having high polarity and high evaporation speed" means a solvent which can satisfy both requirements for the "solvent with high polarity" and "solvent with high evaporation speed".

In this specification, the solubility parameter can be calculated by the Fedors' method. The Fedors' method is disclosed in, for example, "SP value, Basics/Applications and Calculation method" Hideki Yamamoto, published by Joho Kiko Co., Ltd. (2005). The solubility parameter can be calculated according to the following expression by the Fedors' method.$\Sigma$ $$\text{Solubility parameter} = [\Sigma E_{coh}/\Sigma V]^2$$

In the expression, $E_{coh}$ is agglomeration energy density and V is molar volume. Based on $E_{coh}$ and V determined for every atomic group, $\Sigma E_{coh}$ and $\Sigma V$, which are respectively total of $E_{coh}$ and V, are computed to calculate the solubility parameter.

In this specification, the relative evaporation speed means relative evaporation speed in the case where the evaporation speed of n-butyl acetate is defined to be 100, and it is evaporation speed measured according to ASTM D3539-87 and calculated according to the following expression. Specifically, it is calculated by measuring the evaporation time of n-butyl acetate and the evaporation time of every solvent at 25° C. in dry air.

Relative evaporation speed=(time taken to evaporate 90 wt % of $n$-butyl acetate)/(time taken to evaporate 90 wt % of a solvent to be measured)×100

Examples of the solvent with high polarity and high evaporation speed include ethanol, isopropyl alcohol, and the like and especially isopropyl alcohol is preferably used.

The content of isopropyl alcohol in the solvent is preferably 20 wt % or more in the entire solvent amount. If it is less than 20 wt %, agglomerates of the silica fine particles may be formed in the composition for the antiglare layer in some cases. The content of the isopropyl alcohol is preferably 40 wt % or lower.

Examples of the other solvents to be contained in the composition for the antiglare layer include ketones (acetone, methyl ethyl ketone, methyl isobutyl ketone, cyclohexanone, etc.), ethers (dioxane, tetrahydrofuran, etc.), aliphatic hydrocarbons (hexane, etc.), alicyclic hydrocarbons (cyclohexane, etc.), aromatic hydrocarbons (toluene, xylene, etc.), halogenated hydrocarbons (dichloromethane, dichloroethane, etc.), esters (methyl acetate, ethyl acetate, butyl acetate, etc.), alcohols (butanol, cyclohexanol, etc.), cellosolves (methyl cellosolve, ethyl cellosolve, etc.), cellosolve acetates, sulfoxides (dimethyl sulfoxide, etc.), amides (dimethylformamide, dimethylacetamide, etc.), and the like, and their mixtures may also be used.

The composition for the antiglare layer is preferable to further contain a photopolymerization initiator.

The photopolymerization initiator is not particularly limited and known one can be used and specific examples thereof include acetophenones, benzophenones, Michler's benzoyl benzoate, α-amyloxim ester, thioxanthones, propiophenones, benzyls, benzoines, and acylphosphine oxides. A photosensitizer is also preferable to be mixed and used, and specific examples thereof include n-butylamine, triethylamine, poly-n-butylphosphine, and the like.

In the case where the binder resin is a resin having a radical polymerizable unsaturated group, it is preferable to use acetophenones, benzophenones, thioxanthones, benzoin, benzoin methyl ether, and the like alone or in the form of a mixture as the photopolymerization initiator. In the case where the binder resin is a resin having a cation polymerizable functional group, it is preferable to use aromatic diazonium salts, aromatic sulfonium salts, aromatic iodonium salts, metallocene compounds, benzoin sulfonic acid esters, and the like alone or in the form of a mixture as the photopolymerization initiator.

The content of the photopolymerization initiator in the composition for the antiglare layer is preferably 0.5 to 10.0 parts by weight based on 100 parts by weight of the binder resin. If it is lower than 0.5 parts by weight, the hard coat performance of the antiglare layer to be formed becomes insufficient in some cases and if it exceeds 10.0 parts by weight, it may be possible to inhibit curing and therefore, it is not preferable.

The ratio of the raw material (solid matter) in the composition for the antiglare layer is not particularly limited and it is generally 5 to 70 wt % and particularly preferably 25 to 60 wt %.

The composition for the antiglare layer may contain conventionally known dispersants, surfactants, antistatic agents, silane coupling agents, thickeners, coloration prevention agents, coloring agents (pigments and dyes), defoaming agents, leveling agents, flame retardants, ultraviolet absorbents, adhesives, polymerization inhibitors, antioxidants, surface-reforming agents, lubricants, and the like to increase the hardness of the antiglare layer, to suppress the cross-linked curing shrinkage, and to control the refractive index.

Examples of the leveling agents include silicone oil and fluoro surfactants and a fluoro surfactant containing a perfluoroalkyl group or the like is preferable since it can avoid the antiglare layer to have a Benard cell structure. In the case where a resin composition containing a solvent is applied and dried, a surface tension difference or the like is generated between the coating film surface and the inner face in a coating film and accordingly, a large number of convection currents are induced in the coating film. The structure generated by the convection currents is referred to as the Benard cell structure and it becomes a cause of a problem such as orange peel or defective coating on the antiglare layer to be formed.

The above-mentioned Benard cell structure is too much unevenness on the surface of the antiglare layer and causes an adverse effect on white muddiness and scintillation. If the above-mentioned leveling agent is used, this convection can be prevented and not only an uneven film free from defects and ununiformity can be obtained but also the uneven form can be adjusted easily.

A photosensitizer may be added to the composition for the antiglare layer to be used, and specific examples thereof include n-butylamine, triethylamine, poly-n-butylphosphine, and the like.

A method for preparing the composition for the antiglare layer is not particularly limited if the respective components can be mixed evenly, and a known device such as a paint shaker, a bead mill, a kneader, a mixer, or the like can be employed for the preparation.

A method for applying the composition for the antiglare layer to a polyester substrate is not particularly limited, and examples thereof may include known methods such as a spin coating method, a dipping method, a spraying method, a die coating method, a bar coating method, a roll coater method, a meniscus coater method, a flexo-printing method, a screen printing method, and a bead coater method.

After the composition for the antiglare layer is applied by any of the above-mentioned methods, the formed coating film is transported to a heated zone for drying and the coating film is dried by any of various known methods to evaporate the solvent. Herein, the distribution state of the organic fine particles and agglomerates of the silica fine particles can be adjusted by selecting the relative solvent evaporation speed, the solid matter concentration, the coating solution temperature, the drying temperature, the velocity of drying air blow, the drying time, the ambient solvent concentration in the drying zone, and the like.

Particularly, a method for adjusting the distribution state of the organic fine particles and agglomerates of the silica fine particles by selecting the drying condition is simple and easy and thus preferable. Specifically, it is preferable that the drying temperature is 30 to 120° C. and that the velocity of drying air blow is 0.2 to 50 m/s and the drying treatment properly adjusted within the range may be carried out once or a plurality of times to adjust the distribution state of the organic fine particles and agglomerates of the silica fine particles to a desired state.

Examples of a method for radiating ionizing radiation at the time of curing the coating film after the drying include methods using light sources such as a ultrahigh pressure mercury lamp, a high pressure mercury lamp, a low pressure mercury lamp, a carbon arc lamp, a black-light fluorescent lamp, and a metal halide lamp.

The wavelength of ultraviolet rays to be used may be a wavelength in a range of 190 to 380 nm. Specific examples of an electron beam source include various kinds of electron accelerators such as a Cockcroft-Walton type accelerator, a Van de Graaff type accelerator, a resonance transformer type accelerator, an insulation core transformer type accelerator, a linear type accelerator, a dynamitron type accelerator, and a high frequency type accelerator.

In the antiglare film of the present invention, as described above, since the uneven form is formed on the surface of the antiglare layer by the silica fine particles and the organic fine particles, the uneven form can be made smooth. Specifically, the uneven form on the surface of the antiglare layer is preferable to satisfy the following expressions in which Sm is the average interval of the unevenness on the antiglare layer surface; $\theta a$ is the average tilt angle of the uneven part; Ra is the arithmetic mean deviation of the unevenness; and Rz is 10-point average roughness of the unevenness; from the viewpoint that the interference fringe prevention property is secured by making an optical path difference for the interfering light generated by the light reflected on the surface of the antiglare layer and the light reflected on the interface of the antiglare layer in the transparent substrate side, and stray light emission is prevented by removing significant diffusion and at the same time direct transmission is allowed to have a proper extent, so that an antiglare film can give bright images excellent in the bright room- and dark room contrast. If $\theta a$, Ra, and Rz are lower than respective lower limits, the interference fringes cannot be prevented in some cases. If $\theta a$, Ra, and Rz exceeds respective upper limits, the brightness of images may be decreased due to a decrease in the direct transmission components, or the bright room contrast may be lowered due to an increase in the outside light diffusion and reflection, or the dark room contrast may be lowered due to an increase in stray light from transmitted image light. In the configuration of the present invention, if Sm is lower than the lower limit, it may become difficult to control the agglomeration. On the other hand, if Sm exceeds the upper limit, it may generate defects, that is, fineness of an image cannot be reproduced, a tasteless image may be formed, and the like.

$$50 \ \mu m < Sm < 600 \ \mu m$$

$$0.1° < \theta a < 1.5°$$

$$0.02 \ \mu m < Ra < 0.25 \ \mu m$$

$$0.30 \ \mu m < Rz < 2.00 \ \mu m$$

The uneven form of the antiglare layer is more preferable to satisfy the following expressions from the above-mentioned viewpoint.

$$100 \ \mu m < Sm < 400 \ \mu m$$

$$0.1° < \theta a < 1.2°$$

$$0.02 \ \mu m < Ra < 0.15 \ \mu m$$

$$0.30 \ \mu m < Rz < 1.20 \ \mu m$$

The uneven form of the antiglare layer is still more preferable to satisfy the following expressions.

$$120 \ \mu m < Sm < 300 \ \mu m$$

$$0.1° < \theta a < 0.5°$$

$$0.02 \ \mu m < Ra < 0.12 \ \mu m$$

$$0.30 \ \mu m < Rz < 0.80 \ \mu m$$

In this specification, Sm, Ra, and Rz are values measured according to JIS B 0601-1994 and $\theta a$ is a value measured by the definition described in the manual (revised 1995 Jul. 20) (Kosaka Lab) for a surface roughness measurement device: SE-3400 and can be calculated as arc tangent of the total height $(h_1+h_2+h_3+ \ldots +h_n)$ of convex parts existing in a standard length L: arc tangent $\theta a = \tan^{-1} \{(h_1+h_2+h_3+ \ldots + h_n)/L\}$, as shown in FIG. 1.

These Sm, $\theta a$, Ra, and Rz are measured, for example, with a surface roughness measurement device: SE-3400 manufactured by Kosaka Lab., or the like.

The antiglare film of the present invention is preferable to have a total light transmittance of 85% or higher. If it is lower than 85%, in the case where the antiglare film of the present invention is installed in the surface of an image display device, the color reproducibility and visibility may be possibly deteriorated. The total light transmittance is more preferably 90% or higher and still more preferably 91% or higher.

The total light transmittance can be measured by "HM-150" manufactured by Murakami Color Research Laboratory, or the like, according to JIS K7361.

The antiglare film of the present invention is preferable to have a total haze of less than 5.0. The total haze is a haze value (%) obtained by measuring the haze of the entire antiglare film with "HM-150" manufactured by Murakami Color Research Laboratory, or the like, according to JIS K-7136. The antiglare layer may have an inner haze owing to the inner diffusion by the fine particles contained therein and an outside haze owing to the uneven form on the outermost surface, and the inner haze owing to the inner diffusion is preferably in a range of 0% or higher and lower than 5.0%, more preferably in a range of 0% or higher and lower than 4.0%, and still more preferably in a range of 0% or higher and lower than 2.5%. The outer haze of the outermost surface is preferably in a range of 0% or higher and lower than 2.0% and more preferably in a range of 0% or higher and lower than 1.0%. Regarding reflection and/or transmission, in the case where the antiglare layer has intensity at a diffusion angle of 1.0 degree or higher and lower than 2.5 degree, the inner haze and/or the outer haze is most preferably 0%. It is because if the antiglare layer does not have diffusion at a diffusion angle of 1.0 degree or higher by the surface unevenness, an antiglare effect and an interference fringe prevention effect are not caused and if the antiglare layer does not have diffusion at a diffusion angle of 1.0 degree or higher owing to the inner diffusion, the scintillation is intensified. Herein, "in the case where the antiglare layer has intensity at a diffusion angle of 1.0 degree or higher and lower than 2.5 degree" means that the total of the intensity of the diffused light at a diffusion angle from 1.0 degree to 2.4 degree is 10% or higher to the total in the case where the intensity of diffused light is measured at every 0.1 degree of the diffusion angle in a range from 0 degree to 2.4 degree.

In the antiglare film of the present invention, use of fumed silica as the silica fine particles makes it possible to independently control the inner haze and outer haze of the antiglare layer. For example, no inner haze is generated and only the outer haze can be adjusted by using fumed silica since the average particle diameter of the fumed silica is small. The inner haze can be adjusted by controlling a ratio between the refractive index of the organic fine particles and the refractive index of the binder resin or by changing the refractive index in the interface of the organic fine particles by impregnating a monomer of the binder resin in the organic fine particles.

The inner haze can be measured as follows.

A resin having a refractive index equal to or a refractive index different from the refractive index of the resin forming the surface unevenness by 0.02 or less is applied in a dry film thickness of 8 μm (the thickness enough to completely conceal the uneven form of the surface and make the surface flat) with a wire bar, dried at 70° C. for 1 minute, and cured by radiating ultraviolet rays of 100 mJ/cm² intensity. Accordingly, the unevenness of the surface is leveled to give a film with a flat surface. In the case where the resin to be applied to the surface of the antiglare layer is easily repelled and hard to be wet because the composition forming the antiglare layer having the uneven form contains a leveling agent or the like, it is preferable that the surface of the antiglare layer is hydrophilized in advance by saponification treatment (by immersing in a 2 mol/L NaOH (or KOH) solution at 55° C. for 3 minutes, washing with water, completely removing water droplets by Kimwipe (registered trademark) or the like, and drying with an oven at 50° C. for 1 minute).

The film made surface-flat has no surface unevenness and has merely the inner haze. The total haze of this film is measured in the same manner as that for the total haze according to JIS K-7136 to obtain the inner haze.

The outer haze can be obtained as (total haze−inner haze).

Since occurrence of white muddiness can be desirably prevented, the antiglare film of the present invention is preferable to have a low refractive index layer on the antiglare layer.

The low refractive index layer is a layer serving a role for lowering the reflectance when the light from the outside (e.g., a fluorescent lamp and natural light) is reflected on the surface of an optical layered body. The low refractive index layer may be preferably made of any of 1) a resin containing low refractive index particles such as silica or magnesium fluoride; 2) a fluororesin serving as a low refractive index resin; 3) a fluororesin containing silica or magnesium fluoride; and 4) a thin film of a low refractive index substance such as silica or magnesium fluoride. As the resin other than the fluororesin, a resin which is the same as the binder resin constituting the antiglare layer can be used.

The above-mentioned silica is preferably hollow silica fine particles and such hollow silica fine particles can be produced by, for example, a production method disclosed in Examples of Japanese Kokai Publication 2005-099778.

The low refractive index layer has a refractive index of preferably 1.45 or lower and particularly preferably 1.42 or lower.

The thickness of the low refractive index layer is not particularly limited and generally it may be set properly in a range of 30 nm to about 1 μm.

The low refractive index layer is effective even in a monolayer state, but in order to adjust the lowest reflectance to lower and the lowest reflectance to higher, it is also properly possible to form two or more low refractive index layers. In the case where two or more low refractive index layers are formed, it is preferable to make the refractive index and thickness of the respective low refractive index layers different from one another.

As the above-mentioned fluororesin, a polymerizable compound containing at least a fluorine atom in the molecule or its polymer may be used. The polymerizable compound is not particularly limited and examples thereof are preferably those having a curing reactive group such as a functional group cured by ionizing radiation or a polar group cured by heating. Compounds having these reactive groups simultaneously are also usable. As different from the polymerizable compound, the polymer does not have any of the above-mentioned reactive groups.

As the polymerizable compound having a functional group cured by ionizing-radiation, a wide variety of fluorine-containing monomers having ethylenic unsaturated bonds can be used. Specific examples thereof may include fluoroolefins (e.g., fluoroethylene, vinylidene fluoride, tetrafluoroethylene, hexafluoropropylene, perfluorobutadiene, perfluoro-2, 2-dimethyl-1,3-dioxole, etc.). Examples of those having a (meth)acryloyloxy group include (meth)acrylate compounds having fluorine atoms in the molecule such as 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, methyl α-trifluoromethacrylate, and ethyl α-trifluoromethacrylate; and fluorine-containing polyfunctional (meth)acrylic acid ester compounds having a $C_1$-$C_{14}$ fluoroalkyl group, fluorocycloalkyl group, or fluoroalkylene group having at least 3 fluorine atoms in the molecule and also at least 2 (meth)acryloyloxy groups.

Preferable examples of the polar group to be cured by heating are hydrogen bond-forming groups such as a hydroxyl group, a carboxyl group, an amino group, and an epoxy group. These groups are excellent not only in adhesiveness to the coating film but also in the affinity with inorganic fine particles such as silica. Examples of the polymerizable compound having a thermosetting polar group include 4-fluoroethylene-perfluoroalkylvinyl ether copolymers, fluoroethylene-hydrocarbon vinyl ether copolymers, fluorine-modified products of epoxy, polyurethane, cellulose, phenol, polyimide resins and the like.

Examples of the polymerizable compound having the functional group cured by ionizing radiation and the polar group cured by heating may include partially or completely fluorinated alkyl, alkenyl, and aryl esters of acrylic or methacrylic acid; completely or partially fluorinated vinyl ethers; completely or partially fluorinated vinyl esters; completely or partially fluorinated vinyl ketones; and the like.

Examples of the fluororesin may include the followings:

Polymers of a monomer or monomer mixture containing at least one kind of fluorine-containing (meth)acrylate compound of the polymerizable compound having an ionizing-radiation curable group; copolymers of at least one kind of the above-mentioned fluorine-containing (meth)acrylate compound with a (meth)acrylate compound having no fluorine atom in the molecule such as methyl (meth)acrylate, ethyl (meth)acrylate, propyl (meth)acrylate, butyl (meth)acrylate, or 2-ethylhexyl (meth)acrylate; homopolymers and copolymers of a fluorine-containing monomer such as fluoroethylene, vinylidene fluoride, trifluoroethylene, chlorotrifluoroethylene, 3,3,3-trifluoropropylene, 1,1,2-trichloro-3,3,3-trifluoropropylene, or hexafluoropropylene. Silicone-containing vinylidene fluoride copolymers obtained by adding a silicone component to these copolymers are also usable. Examples of the silicon component in this case include (poly)dimethylsiloxane, (poly)diethylsiloxane, (poly)diphenylsiloxane, (poly)methylphenylsiloxane, alkyl-modified (poly)dimethylsiloxane, azo group-containing (poly)dimethylsiloxane, dimethylsilicone, phenylmethylsilicone, alkyl/aralkyl-modified silicone, fluorosilicone, polyether-modified silicone, fatty acid ester-modified silicone, methylhydrosilicone, silanol group-containing silicone, alkoxy group-containing silicone, phenol group-containing silicone, methacryl-modified silicone, acryl-modified silicone, amino-modified silicone, carboxylic acid-modified silicone, carbinol-modified silicone, epoxy-modified silicone, mercapto-modified silicone, fluoro-modified silicone, polyether-modified silicone, and the like. Especially, those having a dimethylsiloxane structure are preferable.

Non-polymers or polymers made of the following compounds are also usable as the fluororesin. That is, compounds obtained by reaction of a fluorine-containing compound having at least one isocyanato group in the molecule with a compound having at least one functional group reactive on the isocyanato group such as an amino group, a hydroxyl group, or a carboxyl group in the molecule; compounds obtained by reaction of a fluorine-containing polyol such as a fluorine-containing polyether polyol, a fluorine-containing alkyl polyol, a fluorine-containing polyester polyol, a fluorine-containing ε-caprolactone-modified polyol with a compound having an isocyanato group; and the like.

Together with the fluorine atom-containing polymerizable compounds and polymers, the respective binder resins described for the above-mentioned antiglare layer may be mixed and used. Further, a curing agent for curing the reactive groups or the like and various kinds of additives and solvents for improving the coatability and providing an anti-staining property may be used properly.

In formation of the low refractive index layer, the viscosity of a composition for the low refractive index layer containing a lower refractive index agent, a resin, etc. is adjusted to a range of preferably 0.5 to 5 mPa·s (25° C.) and more preferably 0.7 to 3 mPa·s (25° C.) in which preferable coatability is obtained. Accordingly, a layer excellent in visible light reflection prevention can be actually formed, a uniform thin film without coating nonuniformity can be formed, and a low refractive index layer particularly excellent in adhesiveness can be formed.

A curing means for the resin may be same as that described for the antiglare layer. In the case where a heating means is utilized for the curing treatment, it is preferable to add a thermal polymerization initiator for starting polymerization of the polymerizable compound by generating, for example, radicals by heating to the fluoro resin composition.

The thickness (nm) $d_A$ of the low refractive index layer is preferable to satisfy the following expression (1):

$$d_A = m\lambda/(4n_A) \qquad (1)$$

wherein, $n_A$ represents a refractive index of the low refractive index layer;

m represents a positive odd numeral and preferably 1;

λ is wavelength and represents a value preferably in a range of 480 to 580 nm.

In the present invention, the low refractive index layer is preferable to satisfy the following expression (2):

$$120 < n_A d_A < 145 \qquad (2)$$

in terms of lowering of the refractive index.

The antiglare film of the present invention may have a primer layer between the polyester substrate and the antiglare layer. The primer layer is a layer to be formed for, as a first purpose, improving the adhesiveness of the polyester substrate and the antiglare layer and also is effective for moderating generation of interference fringes by properly controlling the refractive index and the thickness.

However, in the case where the Δn of the polyester substrate is 0.05 or higher, since the in-plane refractive index difference of the polyester substrate is high, generation of the interference fringes cannot be sufficiently prevented only by the primer layer having a properly controlled refractive index or the like. That is, in the case where the Δn of the polyester substrate is lower than 0.05, it can be expected that the primer layer having a properly controlled refractive index or the like can prevent occurrence of interference fringes; however, in the case where the Δn of the polyester substrate is 0.05 or higher, the configuration of the present invention having the polyester substrate and the antiglare layer is important for sufficiently preventing occurrence of interference fringes.

A material for the primer layer is not particularly limited and for example, conventionally known materials may be properly selected and used. Specific examples thereof include thermosetting or thermoplastic polyester resins, urethane resins, acrylic resins, and their modified products.

In order to adjust the refractive index, the primer layer may contain high refractive index fine particles, a chelate compound, etc.

Those usable as the polyester resins may be polyesters obtained from the following polybasic acid components and diol components.

Examples of the polybasic components may include terephthalic acid, isophthalic acid, phthalic acid, phthalic anhydride, 2,6-naphthalene dicarboxylic acid, 1,4-cyclohexane dicarboxylic acid, adipic acid, sebacic acid, trimellitic acid, pyromellitic acid, dimer acid, and 5-sodium sulfoisophthalic acid.

Examples of the diol components may include ethylene glycol, 1,4-butanediol, diethylene glycol, dipropylene glycol, 1,6-hexanediol, 1,4-cyclohexanedimethanol, xylene glycol, dimethylolpropane, and the like, as well as poly(ethylene oxide) glycol and poly(tetramethylene oxide) glycol.

Examples of the acrylic resins include those which are obtained by copolymerizing the monomers exemplified below.

Examples of the monomers are alkyl acrylate, alkyl methacrylate (examples of the alkyl group are a methyl group, an ethyl group, a n-propyl group, an isopropyl group, a n-butyl group, an isobutyl group, a t-butyl group, a 2-ethylhexyl group, a cyclohexyl group, etc.); hydroxy-containing monomers such as 2-hydroxyethyl acrylate, 2-hydroxyethyl methacrylate, 2-hydroxypropyl acrylate, and 2-hydroxypropyl methacrylate; epoxy group-containing monomers such as glycidyl acrylate, glycidylmethacrylate, and ally glycidyl ether; monomers having a carboxyl group or its salt such as acrylic acid, methacrylic acid, itaconic acid, maleic acid, fumaric acid, crotonic acid, styrene sulfonic acid and its salts (sodium salt, potassium salt, ammonium salt, tertiary amine salt, etc.); amido group-containing monomers such as acrylamide, methacrylamide, N-alkylacrylamide, N-alkylmethacrylamide, N,N-dialkylacrylamide, N,N-dialkylmethacrylate (examples of the alkyl group are a methyl group, an ethyl group, a n-propyl group, an isopropyl group, a n-butyl group, an isobutyl group, a t-butyl group, a 2-ethylhexyl group, a cyclohexyl group, etc.), N-alkoxyacrylamide, N-alkoxymethacrylamide, N,N-dialkoxyacrylamide, N,N-dialkoxymethacrylamide (examples of the alkoxy group are a methoxy group, an ethoxy group, a butoxy group, an isobutoxy group, etc.), acryloylmorpholine, N-methylolacrylamide, N-methylolmethacrylamide, N-phenylacrylamide, and N-phenylmethacrylamide; acid anhydride monomers such as maleic anhydride and itaconic anhydride; oxazoline group-containing monomers such as 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-methyl-2-oxazoline; methoxy diethylene glycol methacrylate, methoxy polyethylene glycol methacrylate, vinyl isocyanate, allyl isocyanate, styrene, α-methylstyrene, vinyl methyl ether, vinyl ethyl ether, vinyltrialkoxysilane, alkyl maleic acid monoester, alkyl fumaric acid monoester, alkyl itaconic acid monoester, acrylonitrile, methacrylonitrile, vinylidene chloride, ethylene, propylene, vinyl chloride, vinyl acetate, and butadiene.

Examples of the urethane resins include those composed of polyols, polyisocyanates, chain extenders, crosslinking agents, and the like.

Examples of the polyols include polyethers such as polyoxyethylene glycol, polyoxypropylene glycol, and polyoxytetramethylene glycol; polyesters produced by dehydration reaction of glycols and dicarboxylic acids such as polyethylene adipate, polyethylene-butylene adipate, and polycaprolactone; polycarbonates having carbonate bonds; acrylic polyols, castor oils, and the like.

Examples of the polyisocyanates include tolylene diisocyanate, phenylene diisocyanate, 4,4'-diphenylmethane diisocyanate, hexamethylene diisocyanate, xylylene diisocyanate, 4,4'-dicyclohexylmethane diisocyanate, isophorone diisocyanate, and the like.

Examples of the chain extenders or crosslinking agents include ethylene glycol, propylene glycol, diethylene glycol, trimethylolpropane, hydrazine, ethylenediamine, diethylenetriamine, triethylenetetramine, 4,4'-diaminodiphenylmethane, 4,4'-diaminodicyclohexylmethane, water, and the like.

As the above-mentioned high refractive index fine particles, metal oxide fine particles with a refractive index of 1.60 to 2.80 may be used preferably.

Specific examples of the metal oxide fine particles include titanium oxide ($TiO_2$, refractive index: 2.71), zirconium oxide ($ZrO_2$, refractive index: 2.10), cerium oxide ($CeO_2$, refractive index: 2.20), tin oxide ($SnO_2$, refractive index: 2.00), antimony tin oxide (ATO, refractive index: 1.75 to 1.95), indium tin oxide (ITO, refractive index: 1.95 to 2.00), phosphorus tin compounds (PTO, refractive index: 1.75 to 1.85), antimony oxide ($Sb_2O_5$, refractive index: 2.04), aluminum zinc oxide (AZO, refractive index: 1.90 to 2.00), gallium zinc oxide (GZO, refractive index: 1.90 to 2.00), niobium pentoxide ($Nb_2O_5$, refractive index: 2.33), tantalum oxide ($Ta_2O_5$, refractive index: 2.16), zinc antimonate ($ZnSb_2O_6$, refractive index: 1.90 to 2.00), and the like.

The above-mentioned high refractive index fine particles have an average primary particle diameter of preferably 5 to 100 nm. If the average primary particle diameter exceeds 100 nm, optical scattering occurs in the primer layer to worsen the transparency in some cases and if it is lower than 5 nm, the fine particles are rather much agglomerated one another and the secondary particle diameter becomes large and optical scattering occurs and the transparency of the primary layer is worsened in some cases.

The refractive index of the high refractive index fine particles is calculated by, for example, mixing a metal oxide of which the weight is measured with a thermoplastic resin of which the refractive index is known; molding the mixture into a transparent pellet with a proper thickness; measuring the refractive index of the pellet; and calculating the refractive index of the high refractive index fine particles based on the mixing ratio of the resin of which the refractive index is known. The refractive index measurement may be carried out by, for example, the Becke method according to JIS K7142 (2008) A method with an Abbe's refractometer and, for example, DR-M4 manufactured by Atago Co., Ltd. may be used. The wavelength for measuring the refractive index is 589 nm.

The average primary particle diameter can be measured as an average value of particle diameters of 20 particles by analyzing images observed by a transmission electron microscope such as TEM or STEM.

The content of the high refractive index fine particles is not particularly limited and may be properly adjusted in accordance with the desired refractive index.

Examples of the chelate compounds include water-soluble titanium chelate compounds, water-soluble titanium acylate compounds, water-soluble zirconium compounds, and the like.

Examples of the water-soluble titanium chelate compounds include diisopropoxybis(acetylacetonato) titanium, isopropoxy(2-ethyl-1,3-hexanediolato) titanium, diisopropoxybis(triethanolaminato) titanium, di-n-butoxybis(triethanolaminato) titanium, hydroxybis(lactato) titanium, an ammonium salt of hydroxybis(lactato) titanium, titanium peroxocitric acid ammonium salt, and the like.

Examples of the water-soluble titanium acylate compounds include oxotitanium bis(monoammonium oxalate), and the like.

Examples of the water-soluble zirconium compounds include zirconium tetraacetylacetonate, zirconium acetate, and the like.

The thickness of the primer layer is not particularly limited and, for example, it is preferably 65 to 125 nm in terms of moderating interference fringes.

The thickness of the primer layer is an average value (nm) obtained by, for example, observing a cross section of the primer layer with an electron microscope (SEM, TEM, STEM) and measuring arbitrary 10 points. In the case where the thickness is very thin, observation at high magnification is recorded as a photograph, which is further enlarged for the measurement. In the case where the photograph is enlarged, the interlayer boundary line, which is very thin line to be apparently understandable as a boundary line, becomes a thick line. In this case, the center part dividing the width of the thick line into two equal parts is defined as the boundary line for the measurement.

In the antiglare film of the present invention, the primer layer can be formed by using a composition for the primer layer prepared by mixing and dispersing the above mentioned materials and, if necessary, a photopolymerization initiator and other components in a solvent.

The mixing and dispersing treatment may be carried out using a known device such as a paint shaker, a beads mill, a kneader, or the like.

As the solvent, water is preferable to be used in the form of an aqueous coating solution such as an aqueous solution, a water dispersion, or an emulsion. A slight amount of an organic solvent may be contained.

Examples of the organic solvent include alcohols (e.g., methanol, ethanol, propanol, isopropanol, n-butanol, sec-butanol, t-butanol, benzylalcohol, PGME, and ethylene glycol), ketones (e.g., acetone, methyl ethyl ketone, methyl isobutyl ketone, cyclopentanone, cyclohexanone, heptanone, diisobutyl ketone, diethyl ketone), aliphatic hydrocarbons (e.g., hexane, cyclohexane), halogenated hydrocarbons (e.g., methylene chloride, chloroform, tetrachloromethane), aromatic hydrocarbons (e.g., benzene, toluene, xylene), amides (e.g., dimethylformamide, dimethylacetamide, n-methylpyrrolidone), ethers (e.g., diethyl ether, dioxane, tetrahydrofuran), ether alcohols (e.g., 1-methoxy-2-propanol), esters (e.g., methyl acetate, ethyl acetate, butyl acetate, isopropyl acetate), and the like.

The other components are not particularly limited and examples thereof include a leveling agent, organic or inorganic fine particles, a photopolymerization initiator, a heat polymerization initiator, a crosslinking agent, a curing agent, a polymerization promoter, a viscosity adjustment agent, an antistatic agent, an antioxidant, a antifouling agent, a slipping agent, a refractive index adjustment agent, a dispersant, and the like.

The composition for the primer layer is preferable to contain a total solid matter in an amount of 3 to 20%. If it is less than 3%, it may cause a residual solvent and whitening. If it is more than 20%, the viscosity of the composition for the primer layer becomes high and the coatability may be lowered to generate nonuniformity or streaks on the surface, or it may become impossible to obtain desired thickness. The solid matter is more preferably in an amount of 4 to 10%.

Application of the composition for the primer layer to the polyester substrate may be carried out in an arbitrary stage, and it is preferable to carried out the application in the polyester substrate production process and it is more preferable to carry out the application to the polyester substrate before the oriented crystallization is completed.

The polyester substrate before the oriented crystallization is completed includes an unstretched film, a uniaxially oriented film obtained by allowing to orientate an unstretched film in one of the vertical direction and the transverse direction, and a film biaxially stretched and oriented in both of the vertical direction and the transverse direction at low stretching ratio (a biaxially stretched film before completion of oriented crystallization by finally re-stretching in the vertical direction or the transverse direction), and the like. Especially, it is preferable to apply an aqueous coating solution of the composition for the primer layer to an unstretched film or a uniaxially oriented film obtained by allowing to orientate an unstretched film in one of the vertical direction and the transverse direction and to carryout the vertical stretching and/or transverse stretching and thermal fixation as it is.

When the composition for the primer layer is applied to the polyester substrate, as preliminary treatment for improving the coatability, it is preferable to carry out physical treatment such as corona surface treatment, flame treatment, or plasma treatment for the polyester substrate surface, or to use the composition for the primer layer together with a surfactant chemically inactive on the composition for the primer layer.

As an application method for the composition for the primer layer, arbitrarily known application method can be employed. For example, a roll coating method, a gravure coating method, a roll brush method, a spray coating method, an air knife coating method, an impregnation method, and a curtain coating method may be employed alone or in combination.

In the antiglare film of the present invention, one or more layers of other layers (antistatic layer, antifouling layer, adhesive layer, other hard coating layers, etc.) may be properly formed, if necessary, within a range where the effect of the present invention is not deteriorated. Especially, at least one layer of the antistatic layer and the stain-proofing layer is preferable to be formed. These layers may be the same as those formed in known laminated bodies for reflection prevention.

The antiglare film of the present invention has a contrast ratio of preferably 80% or higher and more preferably 90% or higher. If it is lower than 80%, in the case where the antiglare film of the present invention is installed in the surface of a display, the dark room contrast becomes inferior and visibility may be possibly deteriorated. In this specification, the contrast ratio is a value measured according to the following method. That is, using a cold cathode-ray tube light source in which a diffusion plate is installed as a backlight unit and two polarizers (AMN-3244TP, manufactured by Samsung), the value ($L_{max}/L_{min}$) calculated by dividing the brightness $L_{max}$ of the light passing when the polarizers are arranged in parallel nicol by the brightness $L_{min}$ of the light passing when the polarizers are arranged in cross nicol is defined as contrast and the value ($L_1/L_2$)×100(%) calculated by dividing the contrast ($L_1$) of the antiglare film (polyester substrate+antiglare layer) by the contrast ($L_2$) of the polyester substrate is defined as a contrast ratio. The brightness is measured in a dark room. A color phase luminance meter (BM-5A, manufactured Topcon Corporation) is used for the measurement of the brightness and the measurement angle of the color phase luminance meter is set to 1° and the measurement is carried out on a visual field of φ5 mm on a sample. The quantity of light of the backlight is set so as to give a brightness of 3600 cd/m$^2$ when two polarizers are arranged in parallel nicol in a state of without setting a sample.

The antiglare film of the present invention can be produced by forming an antiglare layer on the polyester substrate using a composition for an antiglare layer containing, for example, silica fine particles, organic fine particles, monomer components of a binder resin, and a solvent.

Regarding the composition for an antiglare layer and a method for forming the composition for the antiglare layer and the antiglare layer, the same materials and method as those described in the antiglare layer formation method in the above-mentioned antiglare film may be employed.

The antiglare film of the present invention is used as a polarizer by forming the antiglare film of the present invention onto the surface of a polarizing element, the surface being opposite to the face where the antiglare layer of the antiglare film exists. The present invention also provides such a polarizer.

The polarizing element is not particularly limited and for example, a stretched polyvinyl alcohol film, a polyvinyl formal film, a polyvinyl acetal film, a saponified film including an ethylene-vinyl acetate copolymer, and the like which are dyed by iodine or the like may be used. In laminating treatment of the polarizing element and the antiglare film of the present invention, the polyester substrate is preferable to be subjected to saponification treatment. The adhesiveness is made excellent and an anti-static effect can be caused by the saponification treatment.

The present invention also provides an image display device having the antiglare film or the polarizer.

The image display device may be an image display device such as LCD, PDP, FED, ELD (organic EL, inorganic EL), CRT, table PC, touch panel, and electronic paper.

LCD, a representative example of the image display device, is equipped with a transmission display body and a light source device for radiating the transmission display body from the back side. In the case where the image display device of the present invention is LCD, the antiglare film of the present invention or the polarizer of the present invention is formed on the surface of the transmission display body.

In the case where the image display device of the present invention is a liquid crystal device having the antiglare film, the light source of the light source device radiates light from the lower side of the antiglare film. In addition, a retardation plate may be inserted into a liquid crystal display element and a polarizer. If necessary, an adhesive layer may be formed between layers of the liquid crystal display device.

Herein, in the case where the present invention is a liquid crystal device having the antiglare film, the antiglare film can suppress generation of a rainbow interference pattern even if the angle formed between the slow axis of the antiglare film and the absorption axis of the polarizer (the polarizer arranged in the visible side of liquid crystal cells) is any angle, but the antiglare film is preferable to be arranged at an angle of 0°±30° or 90°±30°. If the angle formed between the slow axis of the antiglare film and the absorption axis of the polarizer is within the above-mentioned range, generation of the rainbow interference pattern in the displayed images of the liquid crystal device of the present invention can be highly and efficiently suppressed. The reason for this is not made clear, but it is supposedly attributed to the following reasons.

That is, in an environment where no light such as outer light or a fluorescent lamp exists (hereinafter, such an environment is referred to as "dark place"), generation of the rainbow interference pattern can be suppressed regardless of the angle formed between the slow axis of the antiglare film and the absorption axis of the polarizer in the liquid crystal device of the present invention. However, in an environments where light such as outer light or a fluorescent lamp exists (hereinafter, such an environment is referred to as "bright place"), since light such as outer light or a fluorescent lamp does not necessarily have a continuous and wide spectrum, the rainbow interference pattern is generated and the display quality is deteriorated unless the angle formed between the slow axis of the antiglare film and the absorption axis of the polarizer is within in the above-mentioned range.

Further, since the light of the backlight transmitted through a color filter does not necessarily have a continuous and wide spectrum, it is supposed that the rainbow interference pattern may be generated and the display quality may be deteriorated unless the angle formed between the slow axis of the antiglare film and the absorption axis of the polarizer is within in the above-mentioned range.

Further, if the antiglare film is arranged in a manner that the angle formed between the slow axis of the antiglare film and the absorption axis of the polarizer (the polarizer arranged in the visible side of liquid crystal cells) is adjusted to 45°±15°, good visibility can be obtained even if the liquid crystal device is observed through a polarizer such as sunglasses and therefore, it is preferable.

In the liquid crystal device of the present invention, the backlight light source is not particularly limited, but it is preferably a white light-emitting diode (white LED).

The white LED is an element emitting white by combining a phosphor type, that is, a blue-emitting or ultraviolet-emitting diode using a compound semiconductor and a phosphor. Especially, since a white light emitting diode composed of light emitting elements obtained by combining a blue-emitting diode using a compound semiconductor and a yttrium-aluminum-garnet yellow-emitting phosphor has a continuous and wide light emitting spectrum, it is effective to improve the rainbow interference pattern and also excellent in light emitting efficiency and therefore, it is desirable as a backlight light source in the present invention. Since the white LED with saved power consumption is made widely usable, an energy saving effect can be also exerted.

PDP, the image display device, has a front glass substrate (having an electrode on the surface) and a back glass substrate (having an electrode, and fine grooves on the surface and red-, green-, and blue-phosphor layers in the grooves) arranged on the opposite to the front glass substrate while enclosing a discharge gas therebetween. In the case where the image display device of the present invention is PDP, the antiglare film may be formed on the surface of the front glass substrate or a front plate (a glass substrate or a film substrate).

The image display device may be an ELD device fabricated by depositing zinc sulfide and a diamines substance: a phosphor, which emit light when voltage is applied, on the glass substrate, for carrying out display by controlling the voltage to be applied to the substrate, or may be an image display device such as CRT for generating an image to be seen by the eyes of human being with electric signals being converted into light. In this case, the surfaces of the above-mentioned display devices or the surfaces of their front plates are provided with the antiglare film described above.

Any image display device of the invention can be used for displays of a television, computer, electron paper, touch panel, tablet PC, and the like. Particularly, the image display device can be used preferably for the surfaces of displays for high definition images such as CRT, liquid crystal panel, PDP, ELD, FED, and touch panel.

Advantageous Effects of Invention

Having the above-described configuration, the antiglare film of the present invention can highly and effectively suppress generation of a rainbow interference pattern in a displayed image of an image display device, keep an excellent hard coat property and interference fringe prevention property, and satisfactorily suppress occurrence of scintillation and white muddiness, and as a result, with the antiglare film, displayed images with high contrast can be formed.

Accordingly, the antiglare film of the present invention can be used preferably for a cathode-ray tube display device (CRT), a liquid crystal display (LCD), a plasma display (PDP), an electroluminescence display (ELD), a field-emission display (FED), electronic paper, and the like.

DESCRIPTION OF EMBODIMENTS

Figure 1:
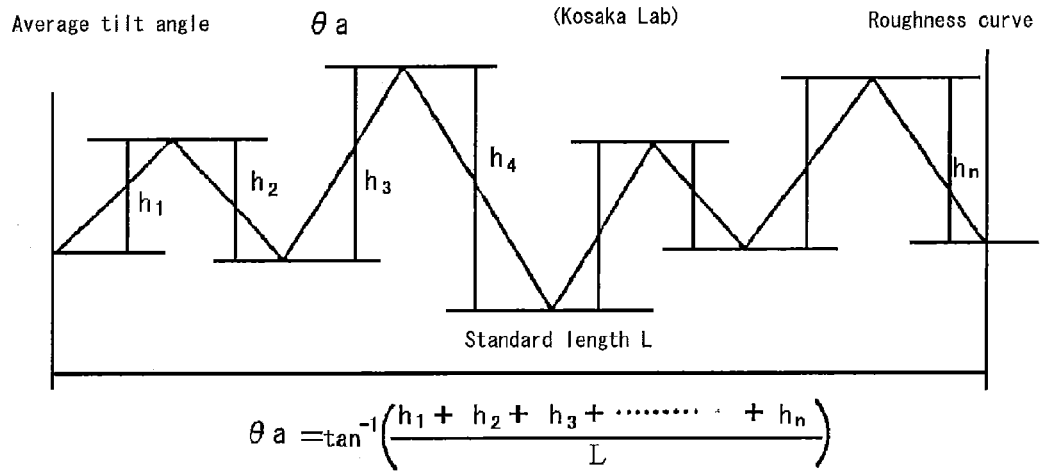
FIG. 1 is an explanatory diagram for a θa measurement method.

The contents of the present invention will be described with reference to the following examples; however, the contents thereof should not be construed as limited to the illustrated embodiments. Unless otherwise specified, "part(s)" and "%" are based on weight.

Retardation of a polyester substrate was measured, using two polarizers, by determining the orientation axis direction of the film and determining refractive indexes (nx, ny) in two axes orthogonal to the orientation axis direction by an Abbe's refractometer (NAR-4T, manufactured by Atago Co., Ltd.). Herein, the axis showing a higher refractive index was defined as a slow axis. The film thickness d (nm) was measured using an electric micrometer (manufactured by Anritsu Corporation) and the unit was converted into nm. The retardation was calculated as a product of a refractive index difference (nx−ny) and the film thickness d (nm).

The value of a refractive index (n) of a primer layer was determined by measuring an average reflectance (R) using a spectrophotometer (UV-3100 PC, manufactured by SHIMADZU CORPORATION.) in a wavelength range of 380 to 780 nm and calculating according to the following expression from the obtained average reflectance (R). The average reflectance of a primer layer was measured in a manner of applying each raw material composition to a 50 μm PET without treatment for easy adhesion to form a cured film with a thickness of 1 to 3 μm; sticking a black vinyl tape (e.g., Yamoto vinyl tape NO200-38-21, 38 mm width) with a wider width than the measurement spot surface area to the face (rear face) in which the PET was not applied for preventing reflection by the rear face; and then carrying out the measurement of the average reflectance of the coating film.

$$R(\%) = (1-n)^2/(1+n)^2$$

Measurement of the thickness of an antiglare layer after dry curing could be done by cross section observation; however, in this case, the thickness was measured at arbitrary 10 points simply by using a thickness measurement device, Digimatic Indicator IDF-130 manufactured by Mitutoyo Corporation and an average value thereof was calculated.

Example 1

A polyethylene terephthalate material was melted at 290° C. and extruded through a film forming die into a sheet-like form which was closely stuck to a rotating quenching drum cooled with cooling water and cooled to produce an unstretched film. The unstretched film was preheated at 120° C. for 1 minute by a biaxial stretching testing device (manufactured by Toyo Seiki Kogyo Co., Ltd.), subsequently stretched at 120° C. at a ratio of 4.5 times, and one face was coated with a composition for a primer layer having composition as shown below by a roll coater.

The coated film was dried successively at 95° C. and stretched at a ratio of 1.5 times in the direction at 90 degree to the former stretching direction to obtain a polyester substrate with a retardation of 9900 nm, a thickness of 100 μm, and (nx−ny) of 0.099. The refractive index of the primer layer was 1.57 and the thickness thereof was 100 nm.

Thereafter, a composition for an antiglare layer having composition as shown below was applied to the formed primer layer to form a coating film. The formed coating film was dried by circulating dry air at a flow velocity of 0.2 m/s and at 70° C. for 15 seconds and further circulating dry air at a flow velocity of 10 m/s and at 70° C. for 30 seconds to evaporate the solvent in the coating film and the film was radiated with ultraviolet rays in an integrated light quantity of 50 mJ/cm$^2$ to cured the coating film and thus an antiglare layer with a thickness of 4 μm (at the time of curing) was formed and an antiglare film of Example 1 was produced.

(Composition for Primer Layer)

| Water dispersion of polyester resin | 28.0 parts by weight |
| water | 72.0 parts by weight |

(Composition for Antiglare Layer)

| Organic fine particles (hydrophilized acryl-styrene copolymer particles, average particle diameter of 2.0 μm, refractive index of 1.55, manufactured by SEKISUI PLASTICS CO., LTD.) | 3 parts by weight |
| Fumed silica (Octylsilane-treated; average particle diameter of 12 nm; manufactured by Nippon Aerosil Co., Ltd.) | 1 part by weight |
| Pentaerythritol tetraacrylate (PETTA) (product name: PETA, manufactured by DICEL-CYTEC Company, Ltd.) | 60 parts by weight |
| Urethane acrylate (product name: UV 1700B, manufactured by the Nippon Synthetic Chemical Industry Co., Ltd.) | 40 parts by weight |
| Irgacure 184 (manufactured by BASF Japan Ltd.) | 5 parts by weight |
| Polyether-modified silicone (TSF 4460, manufactured by Momentive Performance Materials Inc.) | 0.025 parts by weight |
| Toluene | 105 parts by weight |
| Isopropyl alcohol | 30 parts by weight |
| Cyclohexanone | 15 parts by weight |

Fumed silica was hydrophobized by replacing silanol groups with octylsilyl groups by an octyl group-containing silane compound (e.g., octylsilane).

Example 2

A composition for an antiglare layer was prepared in the same manner as in Example 1, except that the addition amount of the organic fine particles was changed to 8 parts by weight, and an antiglare film of Example 2 was produced in the same manner as in Example 1, except that the composition for an antiglare layer was used.

Example 3

A composition for an antiglare layer was prepared in the same manner as in Example 1, except that the addition amount of the organic fine particles was changed to 1 part by weight, and an antiglare film of Example 3 was produced in the same manner as in Example 1, except that the composition for an antiglare layer was used.

Example 4

A composition for an antiglare layer was prepared in the same manner as in Example 1, except that the addition amount of the fumed silica was changed to 2 parts by weight, and an antiglare film of Example 4 was produced in the same manner as in Example 1, except that the composition for an antiglare layer was used.

Example 5

A composition for an antiglare layer was prepared in the same manner as in Example 1, except that the organic fine particles were changed to (hydrophilized acryl-styrene copolymer particles, average particle diameter of 2.0 μm, refractive index of 1.515, manufactured by SEKISUI PLASTICS CO., LTD.), and an antiglare film of Example 5 was produced in the same manner as in Example 1, except that the composition for an antiglare layer was used.

Example 6

An antiglare film of Example 6 was produced in the same manner as in Example 1, except that the stretching ratio of an unstretched film obtained in the same manner as in Example 1 was adjusted and a polyester substrate with a retardation of 3500 nm, a thickness of 42 μm, and (nx−ny) of 0.83 was used.

Example 7

An antiglare film of Example 7 was produced in the same manner as in Example 1, except that the stretching ratio of an unstretched film obtained in the same manner as in Example 1 was adjusted and a polyester substrate with a retardation of 19000 nm, a thickness of 190 μm, and (nx−ny) of 0.10 was used.

Comparative Example 1

A composition for an antiglare layer was prepared in the same manner as in Example 1, except that fumed silica treated by methylation (hydrophobization by replacing silanol groups with methyl groups), and an antiglare film of Comparative Example 1 was produced in the same manner as in Example 1, except that the composition for an antiglare layer was used.

Comparative Example 2

A composition for an antiglare layer was prepared in the same manner as in Example 1, except that no fumed silica was added and an antiglare film of Comparative Example 2 was produced in the same manner as in Example 1, except that the composition for an antiglare layer was used.

Comparative Example 3

A composition for an antiglare layer was prepared in the same manner as in Example 1, except that no fumed silica was added and 8 parts by weight of acryl-styrene copolymer particles which were not hydrophilized (average particle diameter of 2.0 μm, refractive index of 1.55, manufactured by SEKISUI PLASTICS CO., LTD.) were used as the organic fine particles and pentaerythritol triacrylate (PETA) (product name: PETIA, manufactured by DICEL-CYTEC Company, Ltd.) was used in place of the pentaerythritol tetraacrylate (PETTA), and an antiglare film of Comparative Example 3 was produced in the same manner as in Example 1, except that the composition for an antiglare layer was used.

Comparative Example 4

A composition for an antiglare layer was prepared in the same manner as in Example 1, except that aluminosilicate particles (average particle diameter of 2.0 μm, refractive index of 1.50, manufactured by Mizusawa Industrial Chemicals Ltd.) were used in place of the organic fine particles and the addition amount was changed to 6 parts by weight, and an antiglare film of Comparative Example 4 was produced in the same manner as in Example 1, except that the composition for an antiglare layer was used.

Comparative Example 5

A composition for an antiglare layer was prepared in the same manner as in Example 1, except that pentaerythritol triacrylate (PETA) (product name: PETIA, manufactured by DICEL-CYTEC Company, Ltd.) was used in place of the pentaerythritol tetraacrylate (PETTA), and an antiglare film of Comparative Example 5 was produced in the same manner as in Example 1, except that the composition for an antiglare layer was used.

Comparative Example 6

An antiglare film of Comparative Example 6 was produced in the same manner as in Comparative Example 2, except that the stretching ratio of an unstretched film obtained in the same manner as in Example 1 was adjusted and a polyester substrate with a retardation of 2500 nm, a thickness of 75 μm, and (nx−ny) of 0.033 was used.

Comparative Example 7

An antiglare film of Comparative Example 7 was produced in the same manner as in Example 1, except that the stretching ratio of an unstretched film obtained in the same manner as in Example 1 was adjusted and a polyester substrate with a retardation of 2500 nm, a thickness of 75 and (nx−ny) of 0.033 was used.

Comparative Example 8

An antiglare film of Comparative Example 8 was produced in the same manner as in Example 1, except that the stretching ratio of an unstretched film obtained in the same manner as in Example 1 was adjusted and a polyester substrate with a retardation of 2800 nm, a thickness of 34 and (nx−ny) of 0.083 was used.

Reference Example 1

A composition for an antiglare layer was prepared in the same manner as in Example 1, except that (hydrophilized acryl-styrene copolymer particles, average particle diameter of 1.0 μm, refractive index of 1.55, manufactured by SEKISUI PLASTICS CO., LTD.) were used as the organic fine particles and the addition amount was changed to 2 parts by weight, and an antiglare film of Reference Example 1 was produced in the same manner as in Example 1, except that the composition for an antiglare layer was used and the thickness of the antiglare layer was changed to 1.5 μm at the time of curing.

Reference Example 2

A composition for an antiglare layer was prepared in the same manner as in Example 1, except that (hydrophilized acryl-styrene copolymer particles, average particle diameter of 10 μm, refractive index of 1.55, manufactured by SEKISUI PLASTICS CO., LTD.) were used as the organic fine particles and the addition amount was changed to 8 parts by weight, and an antiglare film of Reference Example 2 was produced in the same manner as in Example 1, except that the composition for an antiglare layer was used and the thickness of the antiglare layer was changed to 13 μm at the time of curing.

The obtained antiglare films of examples, comparative examples, and reference examples were evaluated on the following items. Table 1 collectively shows the results.

(Evaluation of Rainbow Interference Pattern)

Each produced antiglare film of examples and comparative examples was arranged on a polarizing element of a liquid crystal monitor (FLATORON IPS 226V (manufactured by LG Electronics Japan) in the observer side to produce a liquid crystal display device. The arrangement was made to form 45° of an angle between the slow axis of the polyester substrate and the absorption axis of the polarizing element of the liquid crystal monitor in the observer side.

Displayed images were observed with eyes and through polarizing sunglasses from the front and oblique direction (about 50°) in a dark place and a bright place (illuminance around the liquid crystal monitor: 400 Lux) to evaluate occurrence of a rainbow interference pattern according to the following criteria. The observation through polarizing sunglasses is a very strict evaluation method as compared with eye observation. The observation was done by 10 persons and the evaluation by the maximum number of the persons was employed as observation result.

Very good: no rainbow interference pattern was observed

Good: rainbow interference pattern was observed, but it was practically acceptable level without any inconvenience Poor: rainbow interference pattern was thinly observed Very poor: rainbow interference pattern was intensely observed (Average Interval (Sm) of Unevenness; Arithmetic Mean Deviation (Ra) of Unevenness; Average Tilt Angle (θa) of Uneven Part; and 10-Point Average Roughness (Rz))

An average interval (Sm) of unevenness; arithmetic mean deviation (Ra) of unevenness; and 10-point average roughness (Rz) were measured according to JIS B 0601-1994 and an average tilt angle (θa) of an uneven part was measured by the method shown in FIG. 1. The above-mentioned Sm, Ra, θa, and Rz were measured by using a surface roughness measurement device: SE-3400/manufactured by Kosaka Lab in the following conditions.

(1) Probe of surface roughness detection part:
   Model/SE2555N (2μ probe), manufactured by Kosaka Lab
   (Tip curvature radius 2 μm/apex: 90 degree/material: diamond)
(2) Measurement conditions of surface roughness measurement device:
   Standard length (cut-off value of roughness curve λc: 2.5 mm
   Evaluation length (standard length (cut-off value λc)×5): 12.5 mm
   Probe sending speed: 0.5 mm/s Generally, the cut-off value is often 0.8 mm, but in the present invention, the cut-off value was set to 2.5 mm for the measurement. The reason for that is because, as described above, the preferable uneven form of the antiglare film having an uneven form in the present invention is an uneven form for preventing reflection of outside light and giving excellent luster blackish impression (reproducibility of luster black color as if wetted in screen display) in the state that an image display device is set to black display. That is, a large and smooth uneven form is preferable and in order to measure this uneven form, it is preferable to set the cut-off value to 2.5 mm for the measurement.

(Interference Fringe Evaluation)

Presence or absence of interference fringes in each obtained antiglare film was inspected by eye observation using an interference fringe inspection lamp (Na lamp) manufactured by Funatech Co., Ltd. and evaluated according to the following criteria. The face opposite to the coated face of each obtained antiglare film was painted with black ink and the coated face was irradiated with the interference fringe inspection lamp and the reflection was observed for the evaluation.

Very good: no interference fringe generation observed

Good: interference fringes were observed, but they were extremely thin and practically acceptable level without any inconvenience Poor: interference fringes were clearly observed (Evaluation of Scintillation)

Scintillation of each obtained antiglare film was evaluated by 15 examiners based on eye observation from various directions, e.g., up and down, right and left, etc. at a distance of about 30 cm in the state that a light box with a brightness of 1500 cd/cm², a black matrix with 140 ppi, and an antiglare film were layered in this order from the bottom. Whether the scintillation was annoying or not was determined and evaluation was done according to the following criteria.

Very good: 10 or more examiners said good

Good: 5 to 9 examiners said good

Poor: 4 or fewer examiners said good (Bright Room Contrast)

The bright room contrast was defined by the following expression.

$$CR(L)=LW(L)/LB(L)$$

(CR(L): bright room contrast, LW(L): bright room white brightness, LB(L): bright room black brightness)

In general, since the fluctuation of bright room white brightness is small and the fluctuation of bright room black brightness is large and therefore, the bright room contrast is dominated by the bright room black brightness. The black brightness of the panel itself is small as compared with the bright room black brightness and is negligible and therefore, the blackness (black brightness) was evaluated to substantially evaluate the bright room contrast according to the following points. Regarding the obtained antiglare film, in order to prevent rear face reflection, a black acryl plate, a transparent pressure-sensitive adhesive, and each obtained antiglare film (the stuck side was non-coated face) were stuck to one another and under bright room environments with a illuminance of 1000 Lux by a 30 W three-wavelength fluorescent lamp (radiated at an angle of 45 degree to the sample face), a sensory evaluation was carried out by 15 examiners (portions where the fluorescent lamp set about 50 cm above the sample and at around 45 degree was not reflected were observed by eye observation and whether the portions were seen black or not was evaluated) and the evaluation was done according to the following criteria.

Very good: 10 or more examiners said good

Good: 5 to 9 examiners said good

Poor: 4 or fewer examiners said good (Darkroom Contrast)

In the darkroom contrast measurement, using a cold cathode-ray tube source of light to which a diffusion plate was attached as a backlight unit and using two polarizers (AMN-3244TP, manufactured by Samsung), the contrast ($L_1$) in the case where the antiglare film (optical transmission substrate+ antiglare layer) was put on the outermost face and the contrast ($L_2$) in the case where only the optical transmission substrate was put on the outermost face were determined by dividing the brightness $L_{max}$ of light passing when the polarizers were arranged in parallel nicol by the brightness $L_{min}$ of light passing when the polarizers were arranged in cross nicol and the contrast ratio $(L_1/L_2) \times 100(\%)$ was calculated and defined as the darkroom contrast ratio.

The measurement of the brightness was carried out using a color phase luminance meter (BM-5A, manufactured Topcon Corporation) in darkroom environments with a illuminance of 5 Luxor less. The measurement angle of the color phase luminance meter was set to 1° and the measurement was carried out on a visual field of ϕ5 mm on each sample. The quantity of light of the backlight was arranged so as to give a brightness of 3600 cd/m² when two polarizers were arranged in parallel nicol in a state of without setting a sample.

Very good: the contrast ratio was 90% or higher
Good: the contrast ratio was 80% or higher and lower than 90%
Poor: the contrast ratio was lower than 80%

(Pencil Hardness)

The pencil hardness (500 g load) of each obtained antiglare film was measured according to JIS K-5400 and evaluated according to the following criteria.

Good: pencil hardness was 2H or higher
Poor: pencil hardness was lower than 2H

A pencil hardness testing machine (manufactured by Toyo Seiki Kogyo Co., Ltd.) was used as an instrument to be used for the pencil hardness measurement. The pencil hardness test was carried out 5 times and in the case where no appearance abnormality such as scratches was observed 4 or more times, the hardness of the used pencil was measured. For example, in the case where the test is carried out 5 times with a 2H pencil and if no appearance abnormality is observed 4 times, the subjected optical laminate body has a pencil hardness of 2H.

(Cracking Property)

Each obtained antiglare sheet was wrapped around a core rod for a cylindrical mandrel method to be used for bending test defined in JIS K5600-5-1 and the cracking property was evaluated according to the way of crack formation based on the following criteria.

Good: no crack was formed even being wrapped on a 8 mm core rod and the state was good
Poor: cracking occurred in the case of being wrapped on a 8 mm core rod.

(Black Hue Impression)

A polarizer without surface coating was stuck after the polarizer on the outermost surface of a liquid crystal television "KDL-40X2500" manufactured by Sony Corporation was peeled off. Next, each obtained reflection-preventing film was stuck by a transparent pressure-sensitive adhesive film for an optical film (product with total light transmittance of 91% or higher, haze of 0.3% or lower, and thickness of 20 to 50 μm, e.g., MHM series; manufactured Nichiei Kakoh Co., Ltd.) in a manner that the antiglare layer side formed the outermost face. The liquid crystal television was set in a room under an illuminance of about 1,000 Lux and DVD "The Phantom of the Opera" released from Media Factory was displayed and 15 examiners watched the pictures from various directions, e.g., up and down and right and left at a distance of 1.5 to 2.0 m from the liquid crystal television and the following items were evaluated by sensory evaluation. The evaluation criteria were as follows. Evaluation was carried out whether the contrast was high, the images were three-dimensional, luster and bright, and the images impressed dynamic feeling at the time of the motion picture display.

Very good: three-dimensional impression and dynamic feeling were all good
Good: one of three-dimensional impression and dynamic feeling was good but the other was normal
Poor: at least one of three-dimensional impression and dynamic feeling was poor The three-dimensional impression and the dynamic feeling were evaluated according to the following criteria.

(Three-Dimensional Impression)
Good: 10 or more examiners said good
Normal: 5 to 9 examiners said good
Poor: 4 or fewer examiners said good (Dynamic Feeling)
Good: 10 or more examiners said good.
Normal: 5 to 9 examiners said good.
Poor: 4 or fewer examiners said good.

TABLE 1

| | Substrate | | | Film | | | | Rainbow interference pattern | |
|---|---|---|---|---|---|---|---|---|---|
| | Re (nm) | Δn | thickness (um) | Sm (μm) | Ra (μm) | θa (°) | Rz (μm) | Eye observation | Through polarizing sunglasses |
| Example 1 | 9900 | 0.099 | 100 | 246 | 0.094 | 0.20 | 0.51 | Very good | Very good |
| Example 2 | | | | 226 | 0.139 | 0.33 | 0.77 | Very good | Very good |
| Example 3 | | | | 412 | 0.071 | 0.15 | 0.37 | Very good | Very good |
| Example 4 | | | | 190 | 0.081 | 0.19 | 0.16 | Very good | Very good |
| Example 5 | | | | 237 | 0.112 | 0.26 | 0.57 | Very good | Very good |
| Example 6 | 3500 | 0.083 | 42 | 242 | 0.093 | 0.21 | 0.53 | Very good | Good |
| Example 7 | 19000 | 0.10 | 190 | 249 | 0.092 | 0.19 | 0.50 | Very good | Very good |
| Comparative Example 1 | 9900 | 0.099 | 100 | 355 | 0.028 | 0.08 | 0.24 | Very good | Very good |
| Comparative Example 2 | | | | 410 | 0.022 | 0.07 | 0.16 | Very good | Very good |
| Comparative Example 3 | | | | 250 | 0.157 | 0.66 | 1.01 | Very good | Very good |
| Comparative Example 4 | | | | 442 | 0.136 | 0.29 | 0.82 | Very good | Very good |
| Comparative Example 5 | | | | 654 | 0.084 | 0.02 | 0.54 | Very good | Very good |
| Comparative Example 6 | 2500 | 0.033 | 75 | 430 | 0.020 | 0.07 | 0.13 | Poor | Very poor |
| Comparative Example 7 | | | | 253 | 0.102 | 0.23 | 0.57 | Poor | Very poor |
| Comparative | 2800 | 0.083 | 34 | 256 | 0.105 | 0.24 | 0.62 | Good | Poor |

TABLE 1-continued

| | | | | | | | | | |
|---|---|---|---|---|---|---|---|---|---|
| Example 8 Reference Example 1 | 9900 | 0.099 | 100 | 170 | 0.092 | 0.17 | 0.49 | Very good | Very good |
| Reference Example 2 | | | | 466 | 0.121 | 0.25 | 0.70 | Very good | Very good |

| | Interference fringes | Bright room contrast | Darkroom contrast | Surface glare | Pencil hardness | Cracking property | Black hue impression |
|---|---|---|---|---|---|---|---|
| Example 1 | Very good | Very good | Very good | Very good | Good | Good | Very good |
| Example 2 | Very good | Good | Very good | Very good | Good | Good | Good |
| Example 3 | Good | Very good | Very good | Very good | Good | Good | Very good |
| Example 4 | Very good | Very good | Very good | Very good | Good | Good | Very good |
| Example 5 | Very good | Very good | Very good | Good | Good | Good | Very good |
| Example 6 | Very good | Very good | Very good | Very good | Good | Good | Very good |
| Example 7 | Very good | Very good | Very good | Very good | Good | Good | Very good |
| Comparative Example 1 | Poor | Very good | Very good | Very good | Good | Good | Very good |
| Comparative Example 2 | Poor | Very good | Very good | Very good | Good | Good | Very good |
| Comparative Example 3 | Good | Poor | Poor | Good | Good | Good | Poor |
| Comparative Example 4 | Very good | Good | Good | Poor | Good | Good | Poor |
| Comparative Example 5 | Good | Good | Very good | Poor | Good | Good | Good |
| Comparative Example 6 | Good | Very good | Very good | Very good | Good | Good | Very good |
| Comparative Example 7 | Very good | Very good | Very good | Very good | Good | Good | Very good |
| Comparative Example 8 | Very good | Very good | Very good | Very good | Good | Good | Very good |
| Reference Example 1 | Very good | Good | Very good | Very good | Poor | Good | Good |
| Reference Example 2 | Very good | Very good | Very good | Good | Good | Poor | Very good |

From Table 1, the antiglare films of examples showed good results in all of the evaluations, whereas there was no antiglare film of comparative examples which was evaluated good in all of the evaluation items. The white muddiness preventing property can be evaluated in the same manner as that of the bright room contrast, and therefore, the antiglare films of examples which were excellent in bright room contrast were also excellent in white muddiness preventing property.

Figure 2:
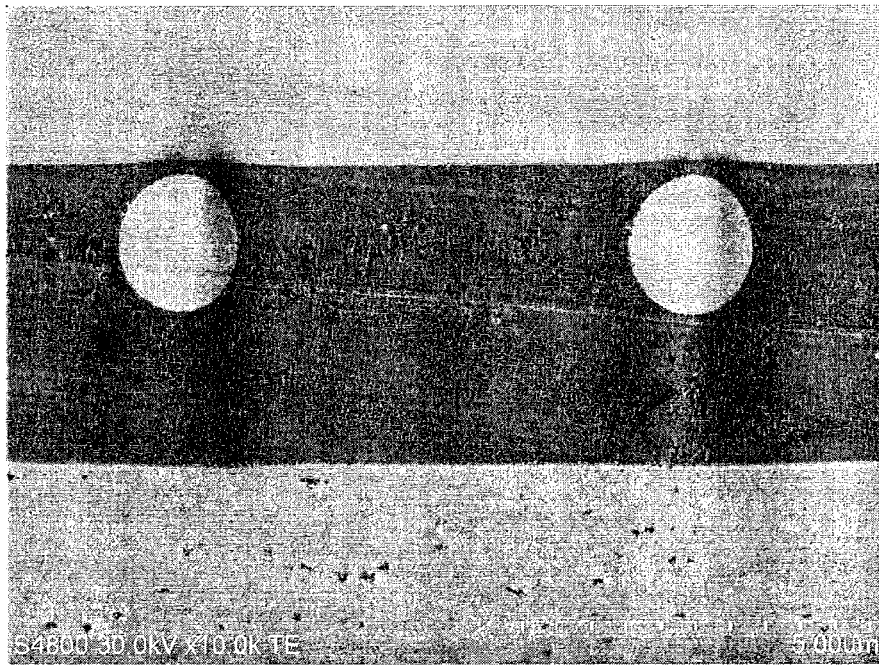
FIG. 2 is a cross-sectional microscopic photograph of an antiglare film of Example 1.
Figure 3:
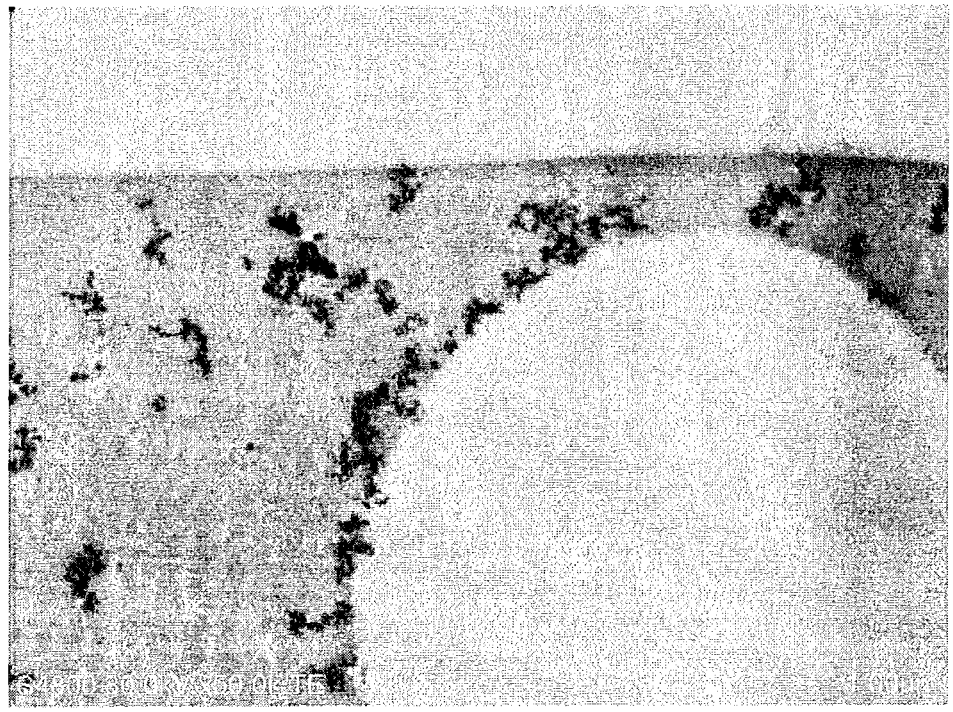
FIG. 3 is an enlarged microscopic photograph of FIG. 2.
Figure 4:
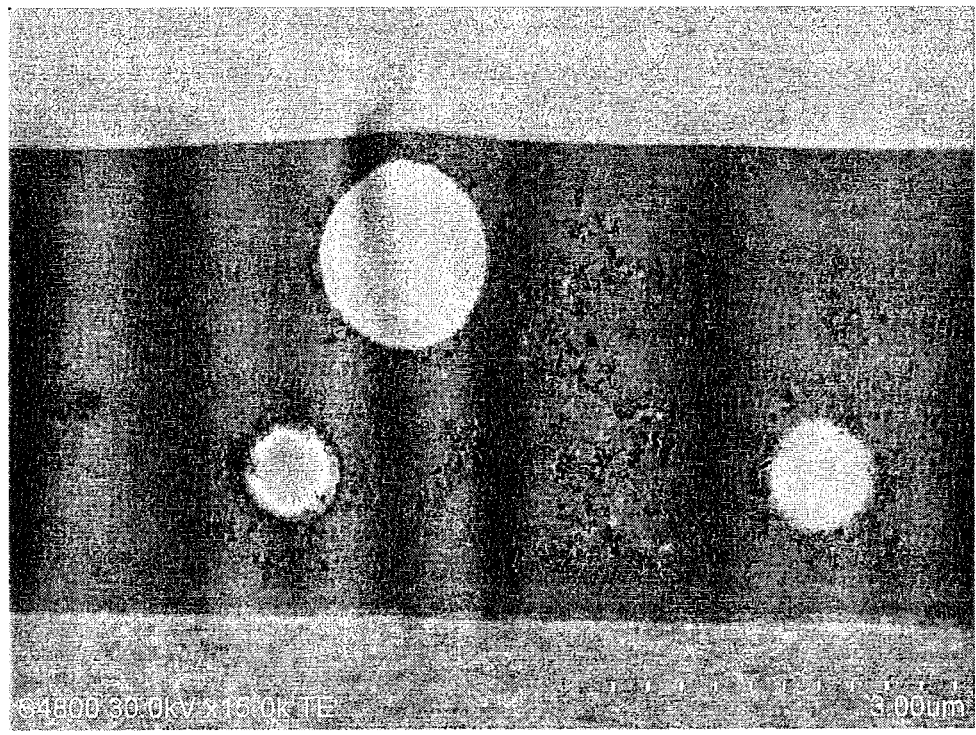
FIG. 4 is a cross-sectional microscopic photograph of an antiglare film of Example 2.
Figure 5:
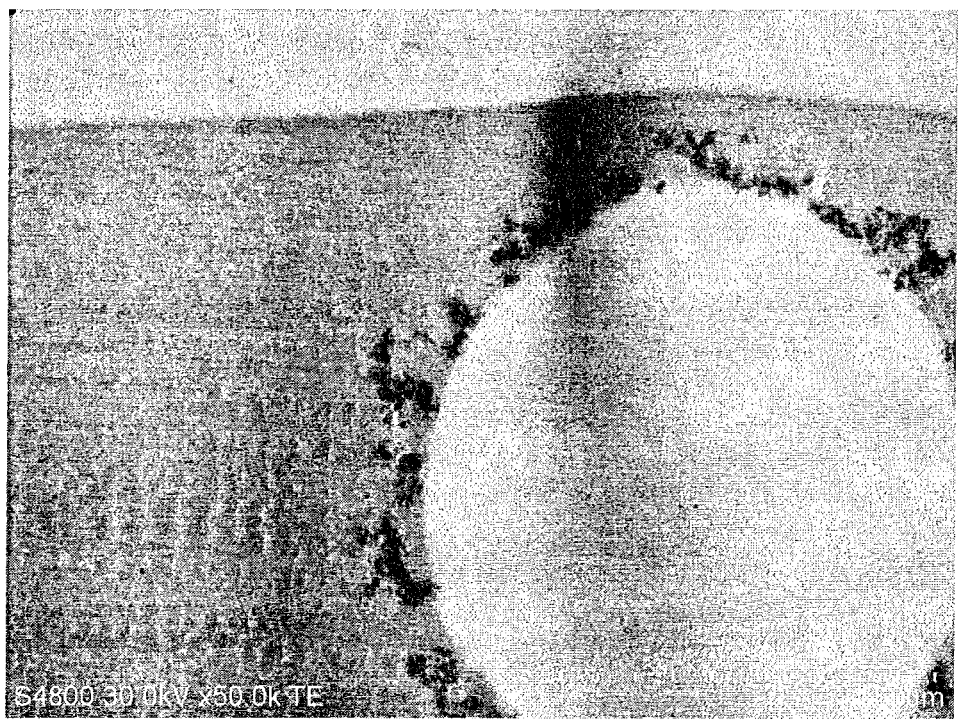
FIG. 5 is an enlarged microscopic photograph of FIG. 4.
Figure 6:
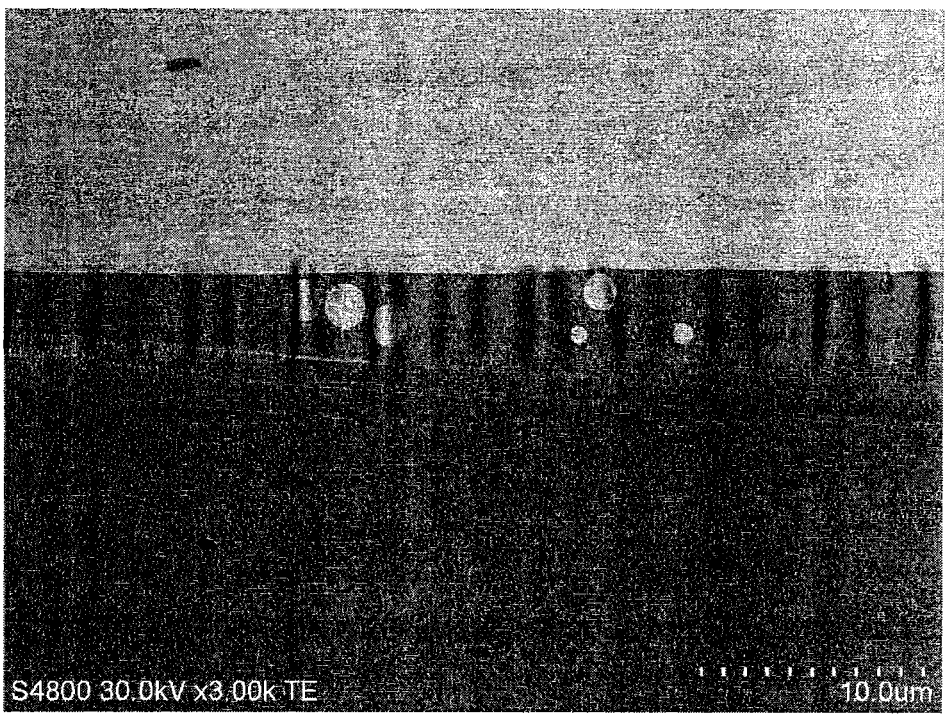
FIG. 6 is a reduced microscopic photograph of FIG. 4.

When the state of the fine particles contained in the antiglare layer was confirmed by cutting each obtained antiglare film in the thickness direction and observing the appeared cross section with an electron microscope (STEM), the silica fine particles in the antiglare layer of the antiglare film of each example formed beaded shape agglomerates and were contained in coarsely and densely in the antiglare layer and densely distributed around the organic fine particles. The organic fine particles had the agglomerates of the silica fine particles on their surfaces and some of the silica fine particles constituting the agglomerates were impregnated in the inside and the organic fine particles were not agglomerated with one another and contained in the antiglare layer in the state of being loosely gathered together. FIG. 2 shows a cross-sectional microscopic photograph of the antiglare film of Example 1; FIG. 3 shows an enlarged microscopic photograph of FIG. 2; FIG. 4 shows a cross-sectional microscopic photograph of the antiglare film of Example 2; and FIG. 5 shows an enlarged microscopic photograph of FIG. 4. In order to show the state that the organic fine particles loosely gathered, FIG. 6 shows a reduced microscopic photograph of FIG. 4.

Figure 7:
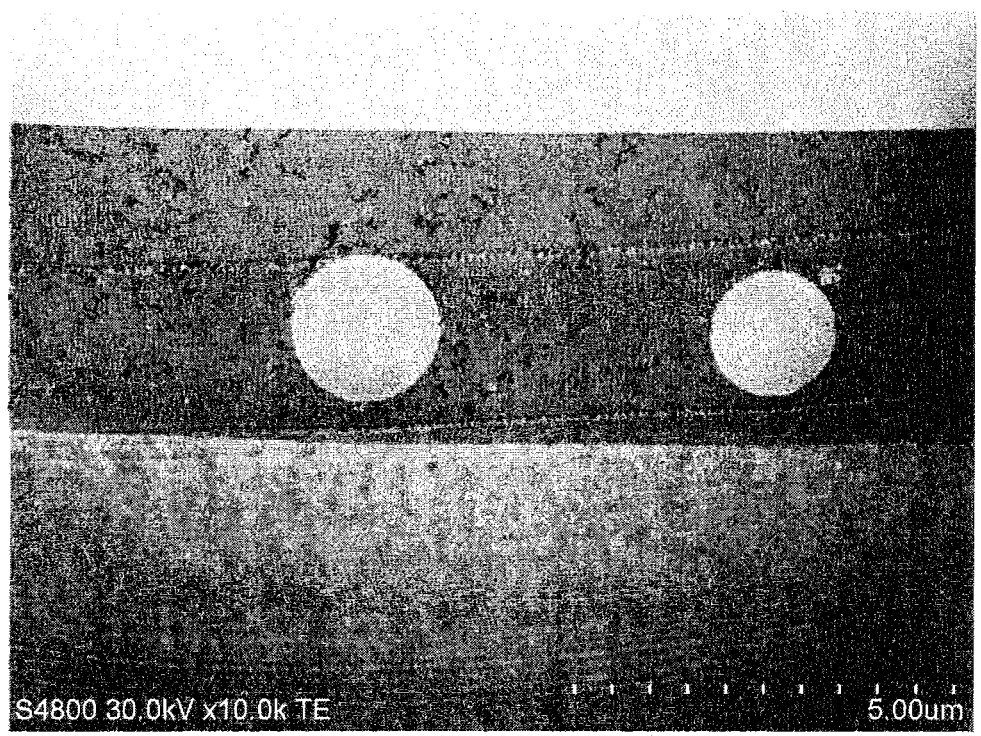
FIG. 7 is a cross-sectional microscopic photograph of an antiglare film of Comparative Example 1.

On the other hand, in the antiglare film of Comparative Example 1, although the silica fine particles were attached to the organic fine particles, the silica fine particles were not contained coarsely and densely in the antiglare layer and the surface-hydrophilized organic fine particles were dispersed without gathering loosely and thus sufficient unevenness was not formed on the surface of the antiglare layer and further the Δn of the polyester substrate was as high as 0.05 or higher, the interference fringe preventing property was inferior. FIG. 7 shows a cross-sectional microscopic photograph of the antiglare film of Comparative Example 1. In the antiglare film of Comparative Example 2, no silica fine particles were contained and the organic fine particles were mono-dispersed in the antiglare layer and thus sufficient unevenness was not formed and the interference fringe preventing property was inferior. The antiglare film of Comparative Example 3 was an antiglare film containing no silica fine particle and in which the organic fine particles formed unevenness and since no silica fine particles were contained, the slope of the unevenness (convex parts) on the surface of the antiglare layer became steep and the antiglare film was inferior in white muddiness and contrast ratio. In the antiglare film of Comparative Example 4, since the organic fine particles were not used, the particles were agglomerated to an excess extent and formed high convex parts and thus the antiglare film was inferior in scintillation. In the antiglare film of Comparative Example 5, since a binder resin of mainly a hydrophilic resin was used, silica was not densely distributed around the organic fine particles and agglomerates of only the silica fine particles became large and bulky and formed the convex parts and thus the antiglare film was inferior in scintillation.

Since the retardation of the polyester substrate was lower than 3000 nm, the antiglare films of Comparative Examples 6, 7, and 8 were inferior in rainbow interference pattern evaluation. Since the Δn of the polyester substrate was low as less than 0.05, the antiglare film of Comparative Example 6 was good in terms of interference fringes owing to the effect of the primer layer, although the unevenness of the antiglare layer was not sufficiently formed.

Although desirable unevenness was formed, the antiglare film of Reference Example 1 was inferior in pencil hardness evaluation because the antiglare layer was too thin. Although desirable unevenness was formed, the antiglare film of Reference Example 2 was inferior in cracking evaluation because the antiglare layer was too thick.

A composition for a low refractive index layer was applied to the surface of the antiglare layer of each antiglare film obtained in examples in a manner of giving a thickness of 0.1 µm after drying (40° C.×1 minute), and the composition was cured by ultraviolet radiation with a radiation dose of 100 mJ/cm$^2$ by using an ultraviolet radiation device (Light source H bulb, manufactured by Fusion UV Systems Japan KK) to produce a low refractive index layer. The antiglare film having the obtained low refractive index layer was more excellent in white muddiness prevention effect.

(Composition for Low Refractive Index Layer)

| | |
|---|---|
| Hollow silica fine particles (solid matter of silica fine particles: 20 wt %, solution; methyl isobutyl ketone, average particle diameter; 50 nm) | 40 parts by weight |
| Pentaerythritol triacrylate (PETA) (manufactured by DICEL-CYTEC Company, Ltd.) | 10 parts by weight |
| Polymerization initiator (Irgacure 127; manufactured by BASF Japan Ltd.) | 0.35 parts by weight |
| Modified silicone oil (X22164E; manufactured by Shin-Etsu Chemical Co., Ltd.) | 0.5 parts by weight |
| MIBK | 320 parts by weight |
| PGMEA | 161 parts by weight |

INDUSTRIAL APPLICABILITY

The antiglare film of the present invention can be used preferably for a cathode-ray tube display device (CRT), a liquid crystal display (LCD), a plasma display (PDP), an electroluminescence display (ELD), a field-emission display (FED), a touch panel, electronic paper, a tablet PC and the like.

The invention claimed is:

1. An antiglare film comprising an antiglare layer having an uneven form on its surface and formed on one face of a transparent substrate having an in-plane birefringence, wherein
said transparent substrate having an in-plane birefringence has a retardation of 3000 nm or higher,
said antiglare layer contains silica fine particles, organic fine particles, and a binder resin,
said silica fine particles have an average primary particle diameter of 1 to 100 nm, and
said silica fine particles include particles forming agglomerates to be contained coarsely and densely in said antiglare layer, wherein the distributed coarsely and densely in the antiglare layer means that there are a plurality of regions where the agglomerates of the silica fine particles are distributed densely so that in the case where an arbitrary cross section in the thickness direction of the antiglare layer is observed at a 10000 magnification by an electron microscope, the regions in which the surface area ratio of the agglomerates of the silica fine particles occupying in the observation region of 2 µm square is 5% or higher and a plurality of regions where the agglomerates of the silica fine particles are distributed coarsely so that in the case where an arbitrary cross section in the thickness direction of the antiglare layer is observed at a 10000 magnification by an electron microscope, the regions in which the surface area ratio of the agglomerates of the silica fine particles occupying in the observation region of 2 µm square is less than 1%,
the agglomerates of said silica fine particles are distributed densely around said organic fine particles, wherein the agglomerates of the silica fine particles distributed densely around the organic fine particles means a state that the surface area ratio of the agglomerates of the silica fine particles to the region which is within a 200 nm outside the organic fine particles and from which the organic fine particles are removed is 10% or higher when a cross section in the thickness direction of the antiglare layer and in which the organic fine particles exist is observed with an electron microscope at a 20000 magnification,
and some of the agglomerates of the silica fine particles densely distributed around said organic fine particles adhere to the surfaces of said organic fine particles and/or some of the silica fine particles constituting said agglomerates are impregnated in the inside of said organic fine particle; and wherein
the uneven form is formed by agglomerates of the silica fine particles and the organic fine particles and
the uneven form satisfies the following expressions:

$$50 \, \mu m < Sm < 600 \, \mu m$$

$$0.1° < \theta a < 0.5°$$

$$0.02 \, \mu m < Ra < 0.25 \, \mu m$$

$$0.30 \, \mu m < Rz < 2.00 \, \mu m,$$

in which Sm is the average interval of the unevenness on the antiglare layer surface; θa is the average tilt angle of the uneven part; Ra is the arithmetic mean deviation of the unevenness; and Rz is a 10-point average roughness of the unevenness.

2. The antiglare film according to claim 1, wherein the transparent substrate having an in-plane birefringence has a difference (nx–ny) of the refractive index (nx) in a slow axis direction, a direction with a high refractive index, and the refractive index (ny) in a fast axis direction, a direction orthogonal to said slow axis direction in a range of 0.05 to 0.20.

3. The antiglare film according to claim 1, wherein the silica fine particles are surface-treated.

4. The antiglare film according to claim 1, wherein the agglomerates of the silica fine particles have an average particle diameter of 100 nm to 1 µm.

5. The antiglare film according to claim 1, wherein the binder resin is obtained from a polyfunctional acrylate monomer having no hydroxyl group in the molecule as a main material.

6. The antiglare film according to claim 1, wherein the organic fine particles are surface-hydrophilized.

7. The antiglare film according to claim 1, wherein the transparent substrate having an in-plane birefringence is a polyester substrate.

8. The antiglare film according to claim 1, having a total haze according to JIS K7136 of less than 5.0.

9. A polarizer comprising a polarizing element, wherein said polarizer has the antiglare film according to claim 1, on the polarizing element surface.

10. An image display device comprising the antiglare film according to claim 1.

11. The image display device according to claim 10, which comprises a white light-emitting diode as a backlight light source.

12. The antiglare film according to claim 1, wherein said silica fine particles have an average primary particle diameter of 5 to 50 nm.

* * * * *